(12) United States Patent
Potnis et al.

(10) Patent No.: US 11,891,736 B2
(45) Date of Patent: *Feb. 6, 2024

(54) FIBERS FOR NON-WOVEN FABRICS HAVING BLENDS OF POLYMERS WITH HIGH AND LOW MELT FLOW RATES

(71) Applicant: O&M Halyard, Inc., Mechanicsville, VA (US)

(72) Inventors: Prasad S. Potnis, Johns Creek, GA (US); Jeffrey L. McManus, Canton, GA (US)

(73) Assignee: O&M HALYARD, INC., Mechanicsville, VA (US)

( * ) Notice: Subject to any disclaimer, the term of this patent is extended or adjusted under 35 U.S.C. 154(b) by 3 days.

This patent is subject to a terminal disclaimer.

(21) Appl. No.: 17/833,292

(22) Filed: Jun. 6, 2022

(65) Prior Publication Data

US 2022/0298691 A1    Sep. 22, 2022

Related U.S. Application Data

(63) Continuation of application No. 16/569,394, filed on Sep. 12, 2019, now Pat. No. 11,390,972.

(Continued)

(51) Int. Cl.
*D04H 1/724* (2012.01)
*D04H 3/16* (2006.01)
(Continued)

(52) U.S. Cl.
CPC ......... *D04H 1/724* (2013.01); *D04H 1/43914* (2020.05); *D04H 1/5412* (2020.05); *D04H 1/5418* (2020.05); *D04H 3/16* (2013.01)

(58) Field of Classification Search
CPC .. D04H 1/724; D04H 15/5412; D04H 1/5418; D04H 1/43914; D04H 3/16
See application file for complete search history.

(56) References Cited

U.S. PATENT DOCUMENTS

| | | |
|---|---|---|
| 5,549,867 A | 8/1996 | Gessner et al. |
| 7,319,122 B2 | 1/2008 | Cheng et al. |
| (Continued) | | |

FOREIGN PATENT DOCUMENTS

| | | |
|---|---|---|
| EP | 1344857 A1 | 9/2003 |
| WO | 2014088856 A1 | 6/2014 |
| (Continued) | | |

OTHER PUBLICATIONS

U.S. Appl. No. 16/569,394, Non-Final Office Action, dated Sep. 30, 2021, 12 pages.

(Continued)

*Primary Examiner* — Jeremy R Pierce
(74) *Attorney, Agent, or Firm* — King & Spalding LLP

(57) ABSTRACT

A spunbond non-woven fabric includes a plurality of fibers. The fibers are formed from a polymer blend that includes at least one first polymer and at least one second polymer. A melt flow rate of the at least one first polymer is greater than a melt flow rate of the at least one second polymer, and the melt flow rate of the at least one second polymer is about 9 g/10 min to less than 18 g/10 min. The blend may include a percentage by weight of the second polymer that is greater than a percentage by weight of the first polymer.

20 Claims, 12 Drawing Sheets

Related U.S. Application Data

(60) Provisional application No. 62/814,355, filed on Mar. 6, 2019, provisional application No. 62/730,249, filed on Sep. 12, 2018.

(51) Int. Cl.
*D04H 1/541* (2012.01)
*D04H 1/4391* (2012.01)

(56) References Cited

U.S. PATENT DOCUMENTS

| | | |
|---|---|---|
| 11,390,972 B2 * | 7/2022 | Potnis .................. D01F 6/46 |
| 2015/0274907 A1 | 10/2015 | MacDonald et al. |
| 2018/0179668 A1 | 6/2018 | Topolkaraev et al. |

FOREIGN PATENT DOCUMENTS

| | | |
|---|---|---|
| WO | 2015187198 A1 | 12/2015 |
| WO | 2016100057 A1 | 6/2016 |

OTHER PUBLICATIONS

U.S. Appl. No. 16/569,394, Notice of Allowance, dated Mar. 23, 2022, 8 pages.
Application No. PCT/US2019/050894, International Preliminary Report on Patentability, dated Mar. 25, 2021, 9 pages.
Application No. PCT/US2019/050894, International Search Report and Written Opinion, dated Dec. 5, 2019, 13 pages.

* cited by examiner

| Test | Sample | 1 | 2 | 3 | 4 | 5 | 6 | 7 | 8 |
|---|---|---|---|---|---|---|---|---|---|
| 1. ASTM D3822-14 - Denier | AVG | 3.412 | 3.111 | 3.535 | 3.260 | 3.183 | 2.729 | 3.203 | 4.660 |
|  | STD | 0.902 | 0.764 | 0.845 | 0.815 | 0.793 | 0.613 | 0.657 | 0.985 |
| 2. ASTM D3822-14 - Calculated Test Speeds [mm/min] | AVG | 60.9600 | 60.9600 | 60.9600 | 60.9600 | 60.9600 | 60.9600 | 60.9600 | 60.9600 |
|  | STD | 0.0000 | 0.0000 | 0.0000 | 0.0000 | 0.0000 | 0.0000 | 0.0000 | 0.0000 |
| 3. ASTM D3822-14 - Peak Load [gf] | AVG | 5.930 | 5.682 | 6.632 | 6.107 | 6.203 | 5.252 | 6.687 | 9.292 |
|  | STD | 1.973 | 1.204 | 1.878 | 1.727 | 1.586 | 1.182 | 1.073 | 2.205 |
| 4. ASTM D3822-14 - Peak Fiber Tenacity [gf/denier] | AVG | 1.762 | 1.868 | 1.885 | 1.893 | 1.954 | 1.944 | 2.120 | 1.997 |
|  | STD | 0.215 | 0.355 | 0.319 | 0.388 | 0.286 | 0.295 | 0.269 | 0.265 |
| 5. ASTM D3822-14 - %Strain At Peak [%] | AVG | 265.36 | 304.39 | 275.98 | 254.38 | 277.71 | 255.85 | 258.88 | 250.27 |
|  | STD | 55.26 | 44.72 | 40.63 | 40.42 | 50.13 | 36.87 | 34.97 | 35.30 |
| 6. ASTM D3822-14 - Modulus [gf/denier] | AVG | 20.467 | 18.598 | 17.343 | 16.226 | 17.262 | 19.754 | 20.258 | 18.120 |
|  | STD | 6.891 | 7.401 | 4.357 | 5.659 | 5.019 | 5.932 | 4.443 | 4.455 |
| 7. ASTM D3822-14 - Breaking Toughness [gf/denier] | AVG | 3.725 | 4.362 | 3.989 | 3.663 | 4.137 | 3.850 | 4.228 | 3.649 |
|  | STD | 1.044 | 1.142 | 0.937 | 0.864 | 1.095 | 0.784 | 0.973 | 0.944 |
| 8. Fiber Diameter [μm] | AVG | 23.0 | 22.0 | 23.4 | 22.5 | 22.2 | 20.6 | 22.3 | 26.9 |
|  | STD | 3.0 | 2.7 | 2.8 | 2.7 | 2.9 | 2.4 | 2.1 | 2.8 |
| 9. Denier | AVG | 3.41 | 3.11 | 3.54 | 3.26 | 3.17 | 2.73 | 3.20 | 4.66 |
|  | STD | 0.90 | 0.76 | 0.84 | 0.81 | 0.79 | 0.62 | 0.66 | 0.98 |
| 10. Optical Diameter | AVG | 9.19 | 8.78 | 9.36 | 8.99 | 8.86 | 8.23 | 8.93 | 10.77 |
|  | STD | 1.21 | 1.08 | 1.12 | 1.10 | 1.14 | 0.97 | 0.93 | 1.10 |
| 11. Fiber Cross Sectional Area [Microns Squared] | AVG | 414.3 | 378.5 | 430.5 | 396.7 | 385.7 | 332.4 | 391.2 | 569.5 |
|  | STD | 14 | 17 | 22 | 24 | 25 | 25 | 25 | 25 |
| 12. % Hollow | AVG | 356.3 | 314.2 | 333.8 | 301.5 | 289.3 | 249.3 | 293.4 | 427.1 |
| 13. Fiber Cross Sectional Area Minus % Hollow (Microns Squared) | AVG | 1.664 | 1.809 | 1.975 | 2.026 | 2.149 | 2.107 | 2.379 | 2.176 |
| 14. ASTM D3822-14 - Peak Load (gf/(cross sectional area *100) | % Change from Sample 1 | 0 | 8.679358 | 18.68242 | 21.71556 | 28.76778 | 26.53847 | 36.95838 | 30.72869 |

FIG. 6

Hollow Fiber Spunbond mechanical properties data (Data Normalized For Basis Weight) using the 4 segment hollow fiber spinneret

| | Sample 9 | Sample 10 | Percent change over Sample 9 | Sample 11 | Percent change over Sample 9 |
|---|---|---|---|---|---|
| Trap Tear CD (Kgf) | 3.41 | 6.14 | 79.85 | 5.37 | 57.39 |
| Trap Tear MD (Kgf) | 6.52 | 10.41 | 59.58 | 10.80 | 65.68 |
| Strip Tensile CD (gf) | 18,240 | 28,463 | 56.08 | 27,375 | 50.08 |
| Strip Tensile MD (gf) | 35,056 | 43,019 | 22.43 | 43,270 | 23.72 |
| Puncture Resistance CD (gf) | 4,800 | 6,985 | 45.53 | 7,001 | 45.86 |
| Puncture Resistance MD (gf) | 4,311 | 5,573 | 29.29 | 5,677 | 31.68 |
| Grab Tensile CD (gf) | 18,102 | 27,639 | 52.68 | 27,314 | 50.89 |
| Grab Tensile MD (gf) | 26,121 | 37,693 | 44.30 | 43,724 | 66.05 |

| | Sample 12 | Sample 13 | Percent change over Sample 12 | Sample 14 | Percent change over Sample 12 |
|---|---|---|---|---|---|
| Trap Tear CD (Kgf) | 2.01 | 2.00 | -0.26 | 2.44 | 21.68 |
| Trap Tear MD (Kgf) | 3.23 | 3.39 | 5.09 | 3.76 | 16.34 |
| Strip Tensile CD (gf) | 10,603 | 8,393 | -11.41 | 12,413 | 17.02 |
| Strip Tensile MD (gf) | 18,322 | 19,562 | 7.10 | 22,017 | 20.16 |
| Basis Weight (gsm) | N/A | N/A | | N/A | |
| Puncture Resistance CD (gf) | 2,669 | 2,980 | 12.00 | 2,570 | -3.35 |
| Puncture Resistance MD (gf) | 2,147 | 2,441 | 11.22 | 2,389 | 11.27 |
| Grab Tensile CD (gf) | 10,175 | 9,158 | -10.00 | 11,409 | 12.13 |
| Grab Tensile MD (gf) | 14,972 | 15,954 | 6.56 | 15,917 | 6.31 |

FIG. 8

FIBERS FOR NON-WOVEN FABRICS HAVING BLENDS OF POLYMERS WITH HIGH AND LOW MELT FLOW RATES

REFERENCE TO RELATED APPLICATIONS

This application is a continuation of U.S. application Ser. No. 16/569,394, filed on Sep. 12, 2019 and entitled FIBERS FOR NON-WOVEN FABRICS HAVING BLENDS OF POLYMERS WITH HIGH AND LOW MELT FLOW RATES, which issued as U.S. Pat. No. 11,390,972, and which claims the benefit of U.S. Provisional Application No. 62/730,249, filed on Sep. 12, 2018 and entitled HOLLOW FIBERS AND NON-WOVENS WITH BLENDS OF POLYMERS HAVING HIGH AND LOW MELT FLOW RATES, and also claims the benefit of U.S. Provisional Application No. 62/814,355, filed on Mar. 6, 2019 and entitled FIBERS AND NON-WOVENS WITH BLENDS OF POLYMERS HAVING HIGH AND LOW MELT FLOW RATES, all of which are hereby incorporated by reference in their entireties.

FIELD OF THE INVENTION

This application relates to non-woven fabrics and, more particularly, to non-woven fabrics intended for use in applications, such as surgical, hygiene, and infection-prevention products, where good physical and mechanical properties are required.

BACKGROUND

Fibrous materials are used in a number of products related to surgical procedures, hygiene, and infection prevention. They may be used to form surgical gowns, drapes, sterilization solutions, gloves, facemasks, protective apparel, disposable diapers, hygiene products, etc. In some cases, it may be desirable for the fibrous material to be lightweight, thin, and easy to use. While use of hollow fibers in such materials has been proposed, existing non-woven materials based on hollow fibers have limited mechanical and/or physical properties that make them unsuitable in the above-mentioned applications. For example, existing non-woven materials formed using hollow fibers can soften and weaken under sterilization temperatures. Such weakening of the fabric makes them more susceptible to cuts, holes, and potential tears propagated during use, and thus makes the fibers unsuitable for inclusion in fabrics and other materials for use in many surgical, hygiene, and infection prevention applications.

SUMMARY

The terms "invention," "the invention," "this invention" and "the present invention" used in this disclosure are intended to refer broadly to all of the subject matter of the disclosure and the claims below. Statements containing these terms should be understood not to limit the subject matter described herein or the meaning or scope of the claims below. Covered embodiments of the invention are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

According to certain embodiments of the present disclosure, a fiber includes a fiber body having a length. The fiber body is formed from a blend of a first polymer and at least 10% by weight of a second polymer, a melt flow rate (MFR) of the first polymer being greater than a MFR of the second polymer. In various examples, a plurality of the fibers may be formed as a spunbond layer on a REICOFIL® III line, on a REICOFIL® IV line, or on a REICOFIL® V line.

In some examples, the fiber may be a hollow fiber or a solid fiber. Optionally, when the fiber is a hollow fiber, the fiber body defines a hollow cavity. In some cases, the hollow cavity constitutes up to about 25% of the volume of the fiber body.

In certain examples, a fabric formed with the hollow or solid fiber has an improved mechanical property in at least one of a machine direction or a cross-machine direction compared to a fabric with a fiber comprising only the first polymer. In various cases, the improved mechanical property includes at least one of a trap tear strength, a strip tensile strength, a puncture resistance, and a grab tensile strength. In certain aspects, the at least one direction is the machine direction. In various examples, a spunbond non-woven fabric includes the hollow fiber or solid fiber. A weight of the spunbond may be less than 105 gsm.

According to certain embodiments of the present disclosure, a spunbond non-woven fabric includes a plurality of fibers, and the fibers are formed from a polymer blend having at least one first polymer and at least one second polymer. A MFR of the at least one first polymer is greater than a MFR of the at least one second polymer, the MFR of the at least one second polymer is less than 18 g/10 min, and the blend comprises a percentage by weight of the second polymer that is greater than a percentage by weight of the first polymer According to certain embodiments of the present disclosure, a spunbond non-woven fabric includes a plurality of fibers, and the fibers are formed from a polymer blend including at least one first polymer and at least one second polymer. A MFR of the at least one first polymer is from about 19 g/10 min to about 40 g/10 min, and a MFR of the at least one second polymer is about 9 g/10 min to about 18 g/10 min. The blend may include at least 10% by weight of the at least one second polymer, and an average diameter of each fiber is from about 13 microns to about 22 microns.

According to certain embodiments of the present disclosure, a spunbond non-woven fabric includes a plurality of hollow fibers, and the hollow fibers are formed from a polymer blend having at least one first polymer and at least one second polymer. A MFR of the at least one first polymer is greater than a MFR of the at least one second polymer, the MFR of the at least one second polymer is about 9 g/10 min to less than 18 g/10 min, and the blend includes at least 10% by weight of the second polymer. The hollow fibers each include a fiber body that defines a cavity within the fiber body, the cavity and the fiber body together define a total volume, and the fibers include a hollowness of at least 5% by volume of the total volume.

Various implementations described in the present disclosure can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures can be designated by matching reference characters for the sake of consistency and clarity.

FIG. 6 is a table of mechanical properties of fabrics formed from fibers having various blends and weights according to aspects of the current disclosure.

FIG. 8 is a table of mechanical properties of fabrics formed from fibers having various blends and weights according to aspects of the current disclosure.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

As used herein, mass flow rate (MFR) is measured according to ASTM D1238-13, entitled STANDARD TEST METHOD FOR MELT FLOW RATES OF THERMOPLASTICS BY EXTRUSION PLASTOMER and published in 2013 ("ASTM D1238") (incorporated herein by reference). MFR is expressed (SI units) in g/10 min, and is the mass of polymer, in grams, flowing in ten minutes through a capillary of a specific diameter (typically about 2 mm) and length by a pressure applied via a range of standard weights at a specified temperature (e.g., 190° C. for polyethylene and 230° C. for polypropylene). As used herein, a "high MFR" polymer is a polymer having a MFR of greater than 18 g/10 min, and a "low MFR" polymer is a polymer having a MFR of from about 9 g/10 min to less than 18 g/10 min. High MFR polymers have lower viscosities and have lower strength, while low MFR polymers have higher viscosities and are typically much stronger than high MFR polymers.

Fibers

Disclosed are fibers useful in non-woven fabrics to give the fabrics mechanical and/or physical properties that are improved over properties of known non-woven materials, making the fibers/nonwovens useful for a number of different applications. In some examples, the fibers include blends of low MFR polymers and high MFR polymers, and the blend includes at least 10% by weight of the low MFR polymers. In various examples, the fibers may also have an average diameter of less than about 30 microns. In certain examples, the fibers may be hollow.

Figure 1:
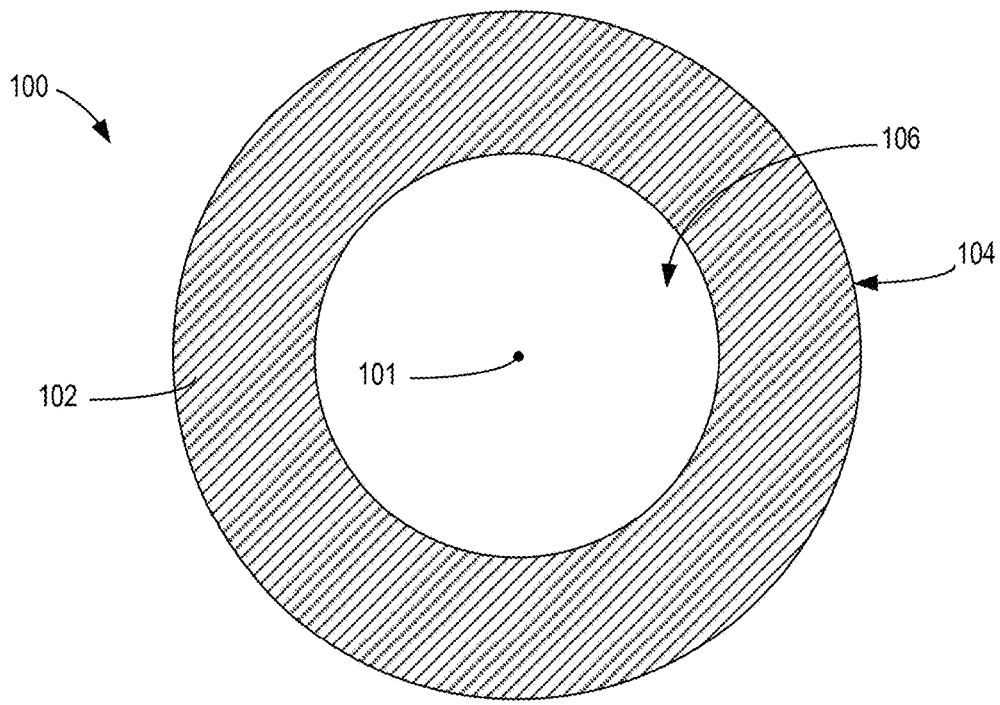
FIG. 1 is a sectional view of a fiber according to aspects of the current disclosure.

FIG. 1 illustrates an example of a fiber 100 according to aspects of the present disclosure. In the example of FIG. 1, the fiber 100 is hollow and defines at least one cavity 106 that extends through the fiber along a length of the fiber (e.g., along a direction of a fiber axis 101). In other examples, the fiber 100 may be solid and need not define the cavity 106. As such, while a hollow fiber is illustrated, it will be appreciated that the following description is equally applicable to solid fibers (fibers without a cavity 106). The terms "fiber" and "filament" are used interchangeably throughout the description and are intended to refer to the same product.

As illustrated in FIG. 1, a hollow fiber 100 includes a fiber body 102 having an outer surface 104. The fiber body 102 extends longitudinally along the fiber axis 101, such that the fiber 100 has a length. In various examples, the fiber body 102 defines a hollow cavity 106 within the fiber body 102. The cross-sectional shape of the fiber body 102 and/or the hollow cavity 106 should not be considered limiting on the current disclosure, as in various examples, the fiber body 102 and/or hollow cavity 106 may have various cross-sectional shapes as desired.

The fiber body 102 may be formed from a blend of polymers. In particular, the fiber body 102 may be formed from a blend of at least one high MFR polymer and at least one low MFR polymer. Examples of high MFR polymers include polypropylenes polymerized using a Ziegler-Natta catalyst (Ziegler-Natta polypropylene). Examples of low MFR polymers include polypropylenes polymerized using a metallocene catalyst (metallocene polypropylene). Traditionally, melt-spun fibers have been formed only from high MFR polymers because their lower viscosities render them easier to spin into filaments. Conversely, low MFR polymers have not been used in melt-spinning fibers, particularly hollow fibers, because their higher viscosities make it more difficult to spin the material into filaments. While high MFR polymers are more easily spun, the resulting solid fiber and/or hollow fiber often has mechanical and/or physical properties that are weakened by high temperatures and/or other extreme conditions and/or due to the lower average molecular weight of the higher MFR polymer. For example, hollow fibers made from high MFR polymers could soften and weaken during steam sterilization, rendering the fabrics into which they are incorporated more susceptible to cuts, holes, and tears during use and thus making them unsuitable for many surgical, hygiene, and infection prevention applications. Moreover, hollow fibers are prone to collapse as the material is not strong enough to retain the hollow structure of the fiber.

It has been discovered that a blend of at least one high MFR polymer and at least one low MFR polymer, where the blend includes at least 10% by weight of the at least one low MFR polymer may be formed into hollow filaments or fibers and spun into fabrics or other products having improved mechanical and/or physical properties (e.g., stable during steam sterilization, puncture resistance, strength, etc.) compared to fabrics having fibers that are not blended. In various aspects, the low MFR polymers may have a MFR of from about 9 g/10 min to about 18 g/10 min. In one aspect, the blend (and thus the resulting fibers) includes from about 10% to about 90% by weight low MFR polymers, such as about 10% by weight low MFR polymers, about 20% by weight low MFR polymers, about 30% by weight low MFR polymers, about 40% by weight low MFR polymers, about 50% by weight low MFR polymers, about 60% by weight low MFR polymers, about 70% by weight low MFR polymers, about 80% by weight low MFR polymers, and/or about 90% by weight low MFR polymers. Various other percentages of the low MFR polymers between 10% and about 90% may also be utilized.

In some examples, the polymer blend (and thus the resulting fibers) may include from about 10% to about 90% by weight high MFR polymers, such as about 20% by weight high MFR polymers, about 30% by weight high MFR polymers, about 40% by weight high MFR polymers, about 50% by weight high MFR polymers, about 60% by weight high MFR polymers, about 70% by weight high MFR polymers, about 80% by weight high MFR polymers, and/or about 90% by weight high MFR polymers. Various other percentages of the high MFR polymers between 10% and less than about 100% may also be utilized.

In addition to the low MFR polymers and the high MFR polymers, the polymer blend may also include other components or additives. In such examples where additional components are added, the blend may include from about 0% to about 10% by weight of the additional components. In various aspects, the additional components may include plastomers, elastomers, pigments, fluorochemicals, antimicrobials, surfactants, anti-stats, and/or various other additives or combinations of additives or other components. In one non-limiting example, the additive may include titanium dioxide. Again, however, in some embodiments the polymer blend is formed exclusively of low and high MFR polymers.

In some embodiments, the low MFR polymers have a MFR of from about 9 g/10 min to less than 18 g/10 min. For example, in some cases, the low MFR polymers have a MFR of about 9 g/10 min, about 10 g/10 min, about 11 g/10 min, about 12 g/10 min, about 13 g/10 min, about 14 g/10 min, about 15 g/10 min, about 16 g/10 min, about 17 g/10 min, and/or various combinations thereof. For example, the blend may include a single type of low MFR polymer or two or more low MFR polymers that have a different MFR, although it need not in other examples.

The high MFR polymers may have a MFR of greater than 18 g/10 min as described previously, and in various cases, may be from about 25 g/10 min to about 40 g/10 min. For example, in some cases, the high MFR polymers may have a MFR of about 19 g/10 min, about 20 g/10 min, about 21 g/10 min, about 22 g/10 min, about 23 g/10 min, about 24 g/10 min, about 25 g/10 min, about 26 g/10 min, about 27 g/10 min, about 28 g/10 min, about 29 g/10 min, about 30 g/10 min, about 31 g/10 min, about 32 g/10 min, about 33 g/10 min, about 34 g/10 min, about 35 g/10 min, about 36 g/10 min, about 37 g/10 min, about 38 g/10 min, about 39 g/10 min, and/or about 40 g/10 min, various combinations thereof, or various other suitable high MFR polymers. In some examples, the high MFR polymers have a MFR of about 35 g/10 min. Similar to the low MFR polymers, the blend may include a single type of high MFR polymer or two or more high MFR polymers that have a different MFR, although it need not in other examples.

In some examples, the polymer blend may include combinations of multiple low MFR polymers and/or multiple high MFR polymers. For example, in some cases, the blend may include two or more low MFR polymers (e.g., one low MFR polymer having a MFR of 9 g/10 min and the other low MFR polymer having a MFR of 11 g/10 min) and one high MFR polymer (e.g., the high MFR polymer has a MFR of 35 g/10 min). In other embodiments, the blend may include one low MFR polymer and two or more high MFR polymers. In further embodiments, the blend may include one low MFR polymer and one high MFR polymer. In still other embodiments, two or more low MFR polymers and two or more high MFR polymers may be used. Various other combinations may be utilized.

In various examples, the polymers used as the low MFR polymers and/or the high MFR polymers include a polyolefin such as, but not limited to, polypropylene (PP) or polyethylene (PE). In some examples, the low MFR polymers and high MFR polymers may both be PP or PE, although they need not be in other examples. For example, in other cases, the polymers may be poly(lactic acid), poly(butylene succinate), metallocene polymers, ziegler-natta polymers, polyester, nylon, and/or various other polymers or combinations of polymers. In one example, the low MFR polymer is a metallocene propylene and the high MFR polymer is a ziegler-natta polypropylene. In some aspects, mixing polymers of two or more MFRS may help increase the percent hollowness of the resulting fiber by stabilizing the solid part of the hollow fiber and preventing or reducing the likelihood of it collapsing.

The hollow fibers described herein and formed with the blend of the low MFR polymers and high MFR polymers have a fiber body that surrounds and defines a cavity. The fiber body and the cavity together define a total volume, and the fiber has a hollowness that is defined herein as the percentage of the total volume occupied by the cavity. In some examples, the hollow fibers may have a hollowness of up to about 40% (i.e., 40% of the volume of the fiber is hollow). In some examples, fibers formed with the blend of the low MFR polymers and high MFR polymers may have a hollowness of from about 5% to about 40%, such as a hollowness of from about 10% to about 30%, such as a hollowness of from about 10% to about 20%, such as a hollowness of from about 7% to about 15%, such as a hollowness of from about 7% to 10%. In certain examples, the hollow fibers may have a hollowness of from about 20% to about 25%.

In various examples, the fibers may be formed to have various suitable external diameters. In some examples, the fibers have an external diameter of less than about 30 microns. For example, in some cases, the fibers have an external diameter of from about 11 microns to about 27 microns, such as about 11 microns, about 12 microns, about 13 microns, about 14 microns, about 15 microns, about 16 microns, about 17 microns, about 18 microns, about 19 microns, about 20 microns, about 21 microns, about 22 microns, about 23 microns, about 24 microns, about 25 microns, about 26 microns, and/or about 27 microns. In other examples, the fibers may have an external diameter that is less than 15 microns and/or greater than 30 microns. The smaller the diameter of the fibers, the finer the fibers, and as such, smaller diameter or finer fibers may have an increased number of contact points with other fibers in a product compared to larger diameter fibers, and the increased contact may increase the strength of the product. The smaller diameter fibers may also provide increased coverage compared to larger fibers. As discussed in detail below, in various aspects, the weight of the fibers and the diameter of the fibers may be controlled to control mechanical and/or physical properties of products that utilize the fibers.

Figure 2:
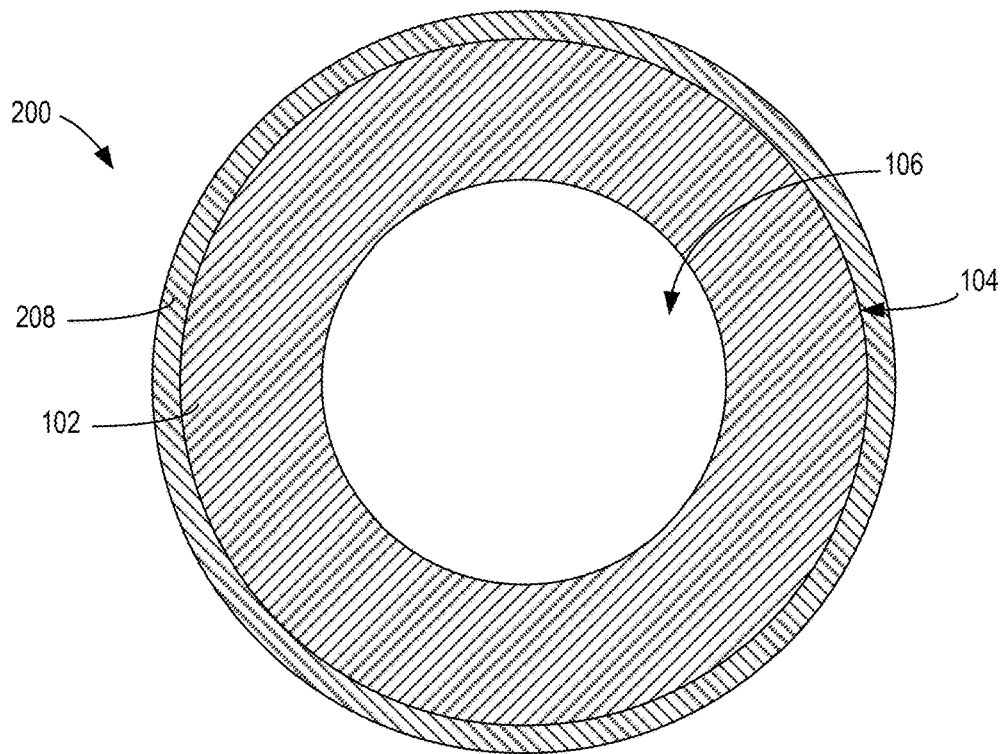
FIG. 2 is a sectional view of another fiber according to aspects of the current disclosure.

FIG. 2 illustrates an example of a fiber 200 that is substantially similar to the fiber 100 except that the fiber 200 includes a sheath layer 208 such that the fiber 200 is a bicomponent fiber. In various examples, the sheath layer 208 may be provided on at least a portion of the outer surface 104 of the fiber body 102. The sheath layer 208 may be formed from a polymer with a MFR that is higher than the MFR of the low MFR polymers used to form the fiber body 102. In some examples, the polymer forming the sheath layer 208 is also a high MFR polymer. In various aspects, the high MFR polymer of the sheath layer 208 may be the same and/or may have the same MFR of the high MFR polymer used to form the fiber body 102, although it need not be in other examples. In some examples, the polymer forming the sheath layer 208 may be a polyolefin, although it need not be. In certain aspects, the sheath layer 208 may include various additives to enhance one or more properties of a non-woven product formed with the fiber 200. As some non-limiting examples, the additive may include fluorochemicals, antimicrobials, surfactants, pigments, anti-stats, and/or various other additives or combinations of additives as desired.

Fibers according to the present disclosure provide a number of advantages over traditional fibers. Embodiments of the fibers formed from a blend of at least one low MFR polymer and at least one high MFR polymer enjoy the benefits that each of the polymer types brings to the blend, while the drawbacks of each polymer is counteracted or neutralized by the other polymer in the blend. Thus, fibers may be customized or tailored to produce desired results (e.g., material savings, increased strength, ease of manufacture, etc.).

For example, inclusion of low MFR polymers in the blend strengthens the fiber, rendering it less apt to collapse or break. In some cases, having at least 10% by weight of the low MFR polymers strengthens the fibers. In various examples, the percentage of low MFR polymers is greater than the percentage of high MFR polymers.

This increase in structural integrity allows one to optionally make the fibers hollow (and enjoy the consequent material cost savings) without detrimentally affecting the fiber's strength and other mechanical and/or physical properties. The low MFR polymer is also better able to withstand the sterilization process without degradation. Thus, a fiber of the present disclosure may be formed to have the same or better mechanical and/or physical properties as traditional fibers while using use less material (because they are hollow). Consequently, products into which they are incorporated may be more lightweight, may be thinner, and may be stronger.

Alternatively, a fiber formed in accordance with embodiments disclosed herein could also use more material (i.e., the fiber is solid or has a reduced percentage hollowness) to further improve its strength and other properties of the fiber.

In such cases, fibers according to the present disclosure may have improved mechanical and/or physical properties (degradation resistance, strength, etc.) by virtue of the presence of low MFR polymers while having the same solidness and/or hollowness as traditional fibers. Various other advantages may be provided with hollow fibers of the current disclosure, and the above listing should not be considered limiting.

Furthermore, inclusion of the high MFR polymer in the blend allows the blend—which includes low MFR polymers that are difficult to spin—to be spun into filaments more easily. Moreover, the blend forming the fiber may facilitate quenching and drawing of the fibers and enhance the effects of those procedures (and thus the mechanical and/or physical properties of the fibers) compared to traditional fibers. Without wishing to be bound by theory, quenching and drawing may be facilitated by both the exterior and the interior (through the hollow core) of the hollow fibers are exposed to treatment during the process. Improved quenching and drawing may result in increased strength of the fibers and resistance to degradation, collapsing, defects, etc. compared to traditional hollow fibers. In various aspects, the low MFR polymer may also help the fiber maintain more hollowness without collapsing on itself because the low MFR polymer has a higher melt strength (and as such, a greater percentage of the fiber has the higher melt strength), which may prevent the collapse of the hollowness during the drawing down. Various other advantages may be realized with hollow fibers according to embodiments of the present disclosure, and those identified above should not be considered limiting.

In various examples, one or more parameters of the fibers may be controlled to produce products having improved mechanical and/or physical properties. As one example, the blend of polymers is controlled to provide stronger hollow or solid fibers. In one non-limiting example, a strong blend of polymers includes 30% high MFR polymers and 70% low MFR polymers. In another non-limiting example, a strong blend of polymers includes 20% high MFR polymers and 80% low MFR polymers. Various other blends of low MFR polymers and high MFR polymers may be utilized. As another example, the average diameter of the fibers is controlled (optionally in conjunction with a strong blend of polymers) to provide improved mechanical and/or physical properties. In one non-limiting example, the average diameter of the fibers is controlled to be about 15 microns to about 20 microns, although various other average diameters may be utilized. As an additional example, the percent hollowness of the fibers is controlled. In some cases, the fibers may be solid, while in other examples, the fibers may up to 40% hollow.

Fabrics

Also disclosed herein are fabrics formed from the fibers described herein. The fibers described herein may be used to form a variety of different fabrics, including, but not limited to, spunbond non-woven materials or fabrics. In general, a spunbond (also called spunlaid) non-woven includes a web of stretched fibers of a thermoplastic resin. Generally, the spunbond is produced by depositing extruded, spun fibers as a web onto a collecting belt (usually in a random manner) followed by bonding the fibers. In some examples, the fibers may form a spunbond fabric that is a single layer; however, in other examples, the fibers may form a fabric that includes a plurality of spunbond layers. Further, the single or plurality of spunbond layers maybe combined with another type of layer such as a meltblown layer.

In certain aspects, spunbond fabrics described herein may be incorporated into products including, but not limited to surgical gowns, sterilization wraps, respirators, absorbent pads, wound care products, chemical protection apparel, filtration media, hospital towels, hospital apparel, drapes, gloves, facemasks, sanitary napkins, diapers, SMS wraps, surgical products (SMS, spunbond, etc.), hygiene products (SMS, spunbond, etc.), and other types of protective and/or hygienic products. In other aspects, the fibers disclosed herein may be used to form various other suitable non-woven products. It will be appreciated that different polymer blends may be used to form the fibers depending on the desired end-use application (e.g., a personal care application could include one blend, a health care application could include another blend, an industrial application could use a further blend, etc.). In still other embodiments, the fibers may be provided in filament form or in staple form that is spun into yarns. These yarns may subsequently be used to form any type of fabric or substrate, including, but not limited to, knitted, woven, and non-woven fabrics and substrates. In some cases, the fibers could be used in carded thermally bonded non-wovens, hydroentangled non-woven materials (e.g., where cellulose or other fibers are combined with layers of the fibers), bicomponent materials (e.g., where bicomponent materials can be used with the fibers), and/or various other applications.

In some examples, fabrics formed with the blended fibers may have a high weight or a low weight. As used herein, a "high weight" refers to less than about 105 gsm, such as from greater than about 30 gsm to about 105 gsm, and low weight such as from about 6 gsm to about 30 gsm. In various examples, the weight of the fabric used may be controlled depending on the desired product that incorporates the fibers. As some non-limiting examples, the fabric may be a spunbond (S)—meltblown (M)—spunbond (S) wrap (i.e., a SMS wrap) (which includes a meltblown layer between spunbond layers), and may have a weight of from about 25 gsm to about 105 gsm. In other examples, the fabric may be a surgical gown having a weight of from about 17 gsm to about 105 gsm, and/or a hygiene product having a weight of from about 6 gsm to about 15 gsm. It will be appreciated that the above ranges should not be considered limiting on the particular products and are provided only as examples. While a SMS fabric is described, it will be appreciated that other patterns of layers of spunbond and meltblown (or other layers) may be utilized. For example, a fabric may have SM layers, SMMS layers, S layers, SS, layers, SMMMS layers, SSMMS layers, etc. as desired.

In some examples, the fibers described herein form a spunbond non-woven fabric. The spunbond non-woven fabric may have a calendar bond pattern with a bond area of from about 12% to about 35%, such as about 30%, although various other bond areas may be utilized. The percent bond area on the fabric is determined by the bond pattern of the calendar roll, and the fabric strength correlates with bond area. In one non-limiting example, the bond area of the calendar bond pattern is about 30%. The bond area of the calendar bond pattern may be controlled (optionally in conjunction with the fiber average diameter, hollowness, and/or blend) to provide improved mechanical and/or physical properties.

Figure 4:
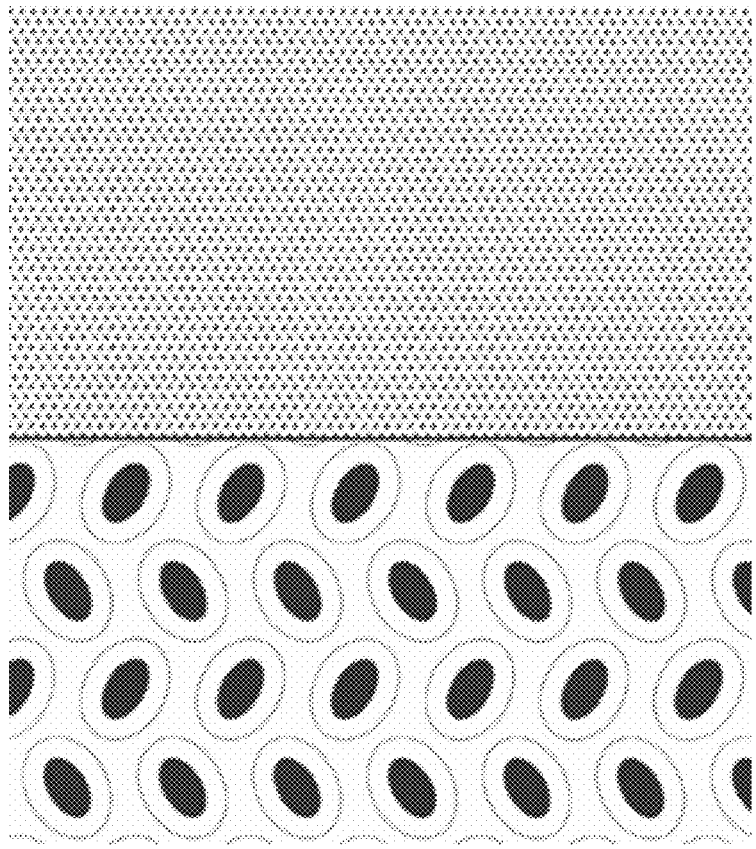
FIG. 4 is an example of another calendar bond pattern according to aspects of the current disclosure
Figure 3:
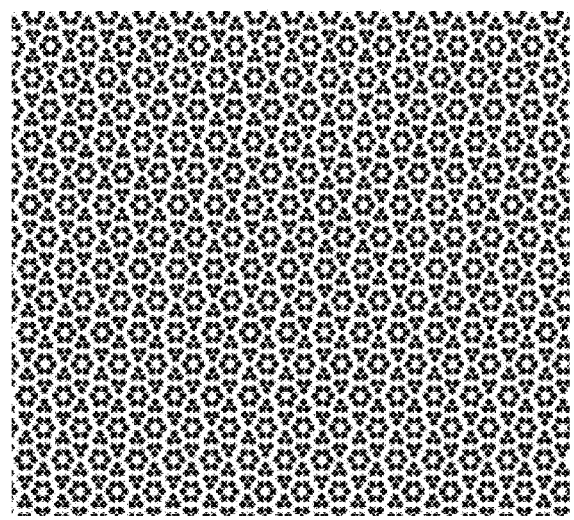
FIG. 3 is an example of a calendar bond pattern according to aspects of the current disclosure.

FIG. 3 illustrates a non-limiting example of a calendar bond pattern according to aspects of the current disclosure having a bond area from about 15% to about 35%. FIG. 4 illustrates another non-limiting example of a calendar bond pattern according to aspects of the current disclosure. In some non-limiting examples, the bond pattern area of FIG. 3 is increased compared to the bond pattern area of FIG. 4. In some cases, products that include the stronger fiber blend (hollow or solid), a decreased fiber average diameter, and the improved bond area may improve coverage to improve the mechanical and/or physical properties in the products. As one example, the improved coverage may help protect a weaker meltblown layer in the middle in the case of the SMS wrap. In one non-limiting examples, a product with improved mechanical and/or physical properties includes (i) fibers having a strong blend of polymers having 30% high MFR polymers and 70% low MFR polymers or 20% high MFR polymers and 80% low MFR polymers and (ii) a fibers having a decreased fiber average diameter of about 15 microns to about 20 microns. Optionally, the product includes (iii) solid fibers and/or (iv) a bond area of from about 15% to about 35%, such as about 30%.

Method of Production

Figure 5:
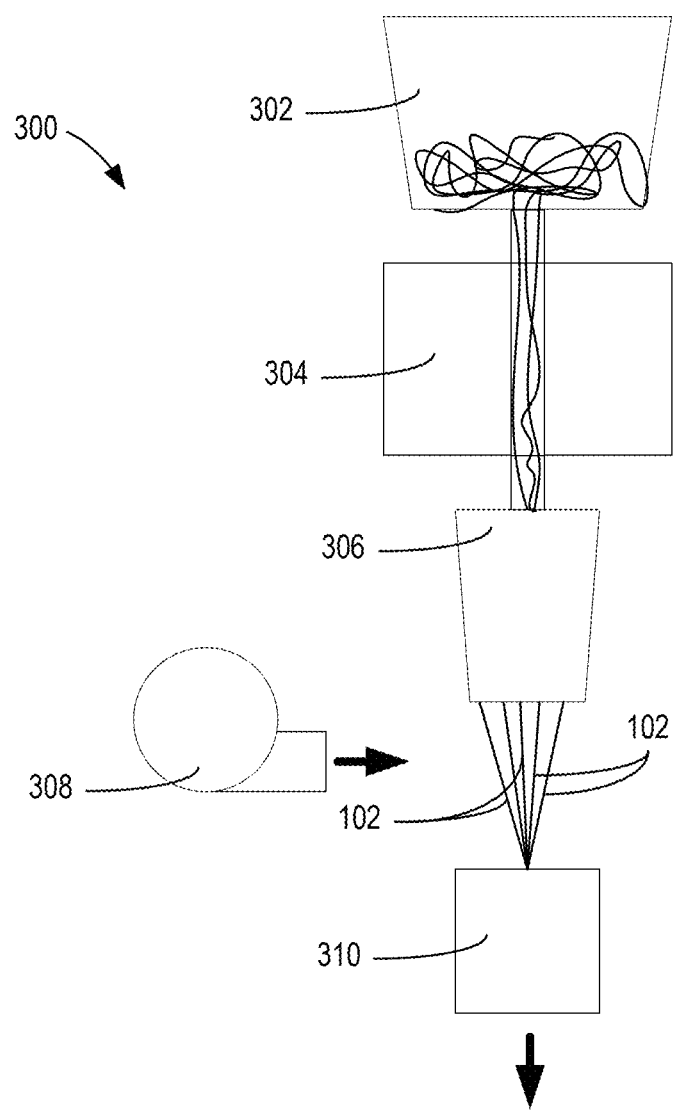
FIG. 5 is a schematic of a process that may be used to form fibers according to aspects of the current disclosure.

FIG. 5 illustrates an example of a spunbond web-making system 300 that may be used to form spunbond non-woven fabrics with the blended fibers as disclosed herein via a spunbond web-making process. In various aspects, a composition with the blend of low MFR polymers and high MFR polymers is provided in a hopper 302. In various aspects, the polymers may be blended prior to being supplied to the hopper 302, or the hopper 302 may be equipped with a blending device. The hopper 302 supplies the blended polymers to a heated extruder 304, which melts and homogenizes the polymers. In other examples, the blend could be extrusion compounded or be formed or blended through various other suitable mechanisms or techniques. From the extruder 304, the melted polymer blend is supplied to a spinneret 306. The spinneret 306 may include one or more openings that the blend is passed through to form the fibers (usually as a fiber curtain). In various examples, the shape and/or configuration of the openings of the spinneret 306 may determine the shape and/or configuration of the fiber and/or any cavity formed therein.

After passing through the spinneret 306, the fibers may be quenched with air from an air generator 308. The fibers may then be melt drawn using a fiber draw device 310. The fibers may be drawn to form the fiber with a desired length. After drawing, the fibers may be deposited for further processing as desired, such as crimping, texturizing, cutting, incorporation into a non-woven web, etc.

In other examples, the hollow (or solid) fibers described herein and/or products incorporating the fibers described herein may be produced in accordance with the REICOFIL® III method and system sold by Reifenhauser Gmbh & Co. Maschinenfabrik. The REICOFIL® III system and method is extensively described in U.S. Pat. No. 5,814,349 ("the '349 patent"). The '349 patent is hereby incorporated by reference in its entirety. As described in the '349 patent, the REICOFIL® III method and system can include: a spinneret that produces strands; cooling means below the spinneret for cooling the strands from the spinneret to form filaments; a stretching system that receives the thermoplastic filaments for aerodynamic stretching; a web-depositing system below the stretching system in which a web of the tangled and stretched filaments are deposited; a continuously circulating sieve belt for forming a web from the tangled filaments; means for forming an air inlet gap; a first pair of pressing rollers; a second pair of pressing rollers; means forming a suction shaft for drawing the filaments against the belt; and/or means for functionally separating the stretching system from the web depositing system. In some cases, the REICOFIL® III system is a one-beam line with production speeds of up to 300 meters per minute, although it need not be in other examples. In other cases, the system may be a single beam line, a double beam line, a multiple beam line, etc. as desired. In some cases, the number of beam lines may depend on the desired number of layers in the final product. The spinneret may be a two segment spinneret (meaning that the spinneret forms a hollow cavity in each fiber having two sides), a three segment spinneret (meaning that the spinneret forms a hollow cavity in each fiber having three sides), a four segment spinneret (meaning that the spinneret forms a hollow cavity in each fiber having four sides), spinnerets having various other suitable designs, or various other suitable spinnerets. In certain examples, the smaller segment spinnerets (e.g., two segment spinnerets) may form fibers having smaller openings (i.e., reduced hollowness) compared to those formed by greater segment spinnerets (e.g., four segment spinnerets).

In various other examples, the hollow (or solid) fibers described herein and/or products incorporating the fibers described herein may be produced in accordance with the REICOFIL® IV method and system sold by Reifenhauser Gmbh & Co. Maschinenfabrik. The REICOFIL® IV system and method are extensively described in U.S. Pat. No. 6,918,750 ("the '750 patent"). The '750 patent is hereby incorporated by reference in its entirety. As described in the '750 patent, the REICOFIL® IV method and system can include: a spinneret that produces strands; cooling means below the spinneret for cooling the strands from the spinneret to form filaments; an intermediate channel; a stretching system that receives the thermoplastic filaments for aerodynamic stretching; a tiering or distribution unit; a continuously circulating belt or screen for forming a web from the tangled filaments; at least one first pair of pressing rollers; means forming a suction shaft for drawing the filaments against the belt; and/or means for functionally separating the stretching system from the tiering or distribution unit. In some cases, the REICOFIL® IV system is a one-beam line with production speeds of up to 600 m/min, although it need not be in other examples. In other cases, the system may be a single beam line, a double beam line, a multiple beam line, etc. as desired. In some cases, the number of beam lines may depend on the desired number of layers in the final product. The spinneret may be a two segment spinneret, a four segment spinneret, or various other suitable spinnerets.

In other examples, the fibers described herein and/or products incorporating the fibers described herein may be produced in accordance with the REICOFIL® V method and system sold by Reifenhauser Gmbh & Co. Maschinenfabrik. A difference between the REICOFIL® V system and other REICOFIL® systems is that the REICOFIL® V system has a higher throughput (e.g., 150-270 kg per hour and meter width compared to 120-200 kg per hour and meter width for REICOFIL® IV), a higher production speed (up to 1200 m/min), and improved uptime.

EXAMPLES

The mechanical properties of spunbond fabrics having solid fibers or hollow fibers consistent with embodiments described herein were tested according to accepted industry standard methods. Each sample fabric included fibers with a different blend of a high MFR PP polymer and a low MFR PP polymer. In each case, the spunbond fabrics were formed with a four segment spinneret unless described otherwise. The properties of the fabrics were measured at room temperature unless described otherwise. As used herein, the meaning of "room temperature" can include a temperature of from about 15° C. to about 30° C., for example about 15° C., about 16° C., about 17° C., about 18° C., about 19° C., about 20° C., about 21° C., about 22° C., about 23° C., about 24° C., about 25° C., about 26° C., about 27° C., about 28° C., about 29° C., or about 30° C. Unless otherwise specified, the term diameter refers to the fiber diameter measured in microns. For each example discussed below, the spunbond fabrics for the particular example were all spun with the same settings and parameters.

Example 1

Sample spunbond fabrics were formed by a spunbonding process and using a four segment spinneret. The spunbond fabrics had fibers with different blends of Polymer 1 and Polymer 2. Polymer 1 was a polypropylene homopolymer having a MFR of 35 g/10 min. and a density of about 0.900 g/cm$^3$, available from Exxon Mobil® as PP3155. Polymer 2 was a polypropylene homopolymer having a MFR of 14 g/10 min. and a density of about 0.905 g/cm$^3$, available from Total® as M3661. The sample fabrics were tested according to the standards described below.

In this example, each sample fabric was a single spunbond layer of the fibers. The samples had the compositions shown in Table 1 below.

TABLE 1

| Compositions of Samples 1-8 | | |
| --- | --- | --- |
| Sample | % Polymer 1 | % Polymer 2 |
| 1 | 100 | 0 |
| 2 | 80 | 20 |
| 3 | 70 | 30 |
| 4 | 60 | 40 |
| 5 | 40 | 60 |
| 6 | 30 | 70 |
| 7 | 20 | 80 |
| 8 | 0 | 100 |

Tests 1-4 were each repeated twenty-four (24) times for each Sample to measure its mechanical properties. Tests 1-7 and 14 were performed according to ASTM D3822-14, entitled STANDARD TEST METHOD FOR TENSILE PROPERTIES OF SINGLE TEXTILE FIBERS and published in 2014 (incorporated herein by reference) ("ASTM D3822-14"), in dry conditions and in a direction of the length of the fabric. Tests 8-11 and 13 were performed using a video microscope and micrometer. Test 12 was performed according to STM-00161, Revision 0 from Kimberly-Clark, which is entitled DENIER MEASUREMENT USING A VIDEO MICROSCOPE AND MICROMETER and published Jun. 13, 2012 (incorporated herein by reference) ("STM-00161"). FIG. 6 summarizes the results from these tests.

Example 2

Figure 7:
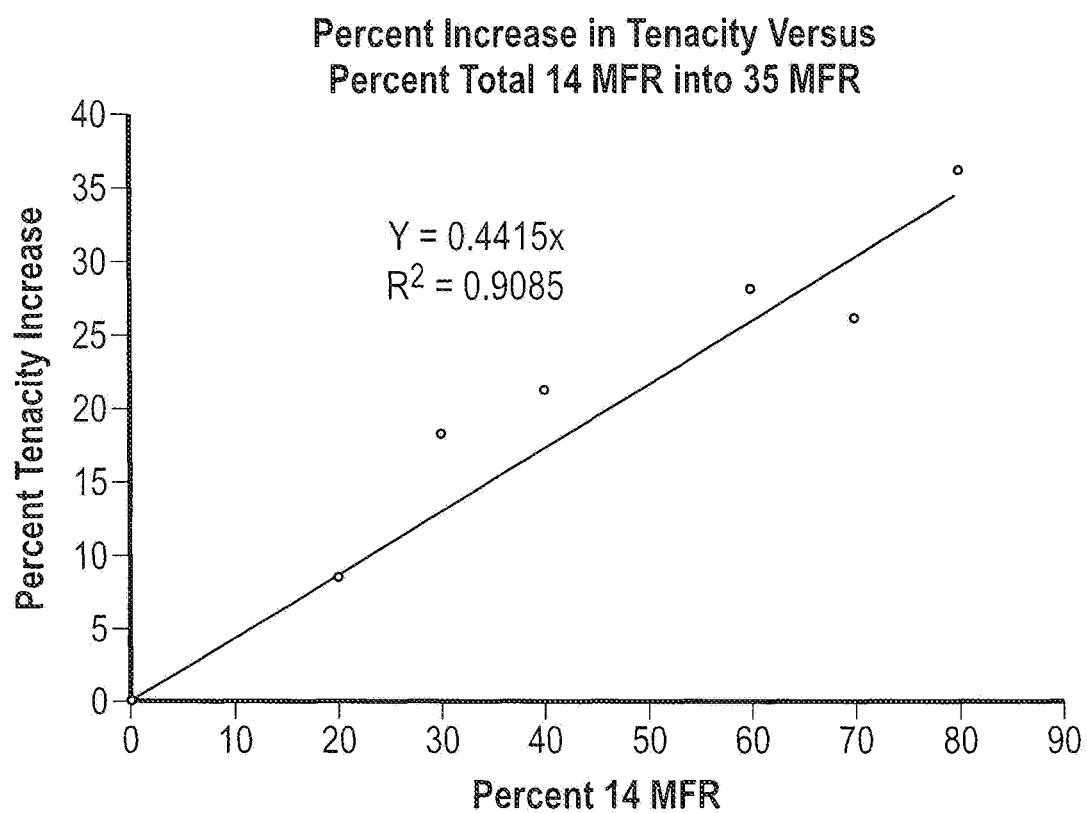
FIG. 7 is a graph illustrating percent increase in tenacity of fabrics formed from fibers having various blends according to aspects of the current disclosure.

The percent increase in tenacity (or strength) of spunbond fabrics having blended fibers with various percentages of Polymer 2 and Polymer 1 was tested according to ASTM D3822-14. FIG. 7 summarizes the results from these tests. As illustrated in FIG. 7, there is a general correlation between the percent increase in tenacity and the percentage of the low MFR PP polymer (i.e., Polymer 2).

Example 3

Sample fabrics were formed by a spunbonding process and using a four segment spinneret. The spunbond layers had different weights and fibers with different percentages of Polymer 1 and Polymer 2, and were tested according to the standards described below. Each sample fabric was a spunbond layer of fibers. The average diameter of the fibers of each sample fabric was 21 microns.

In this example, each sample was a single spunbond layer of the fibers. The samples had the compositions shown in Table 2 below.

TABLE 2

Compositions of Samples 9-14

| Sample | % Polymer 1 | % Polymer 2 | Average diameter (microns) | Weight (gsm) | Hollowness (%) |
|---|---|---|---|---|---|
| 9 | 100 | 0 | 21 | 71 | 10.0 |
| 10 | 30 | 70 | 21 | 71 | 17.0 |
| 11 | 20 | 80 | 21 | 71 | 24.0 |
| 12 | 100 | 0 | 21 | 34 | 10.0 |
| 13 | 30 | 70 | 21 | 34 | 17.0 |
| 14 | 20 | 80 | 21 | 34 | 24.0 |

Trapezoidal Tear Strength: Samples 9-14 described above were tested according to Standard Test Method STM-00195, Revision 0 from Kimberly-Clark, which is entitled TEARING STRENGTH—TRAPEZOID TEAR and published Jul. 19, 2012 (incorporated herein by reference ("STM-00195"), a measured in both the cross-machine direction (CD) and the machine direction (MD).

Strip Tensile Strength: Samples 9-14 described above were tested according to STM-00198, Revision 1 from Kimberly-Clark, which is entitled STRIP TENSILE OF NON-WOVEN MATERIAL and published Aug. 2, 2012 (incorporated herein by reference) ("STM-00198"), and were measured in both the machine direction and the cross-machine direction.

Puncture Resistance: Samples 9-14 described above were tested according to STM-00483, Revision 0 from Kimberly-Clark, which is entitled PUNCTURE RESISTANCE and published Dec. 17, 2015 (incorporated herein by reference) ("STM-00483"), and were measured in both the machine direction and the cross-machine direction.

Grab Tensile Strength: Samples 9-14 described above were tested according to STM-00146, Revision 1 from Kimberly-Clark, which is entitled GRAB TENSILE, PEAK STRETCH, AND PEAK ENERGY—NON-WOVENS and published Nov. 30, 2015 (incorporated herein by reference) ("STM-00146"), and were tested in both the machine direction and the cross-machine direction.

The results from these tests are summarized in FIG. 8. For each test, FIG. 8 also shows the percent change of Sample 10 over Sample 9, the percent change of Sample 11 over Sample 9, the percent change of Sample 13 over Sample 12, and the percent change of Sample 14 over Sample 12. As illustrated, the fabrics that included blended fibers that included the lower MFR polymers (i.e., Samples 10, 11, 13, and 14) demonstrated improved physical properties compared to the fibers that only included the high MFR polymers (i.e., Samples 9 and 12). In addition, lower weight fabrics with blended fibers (i.e., Samples 13 and 14) demonstrated improved physical properties in at least the machine direction compared to Sample 12. Based on this, fabrics and other materials having fibers formed with a polymer blend that include lower MFR polymers can improve the resistance to formation of holes, cuts, tears, etc. in such products. Fabrics with fibers from polymer blends that include lower MFR polymers may optionally allow for the production of lighter weight fabrics or products while providing improved mechanical properties, and may improve the mechanical properties of products incorporating such fabrics.

Example 4

Sample fabrics were formed by a spunbonding process and using a four segment spinneret. The spunbond layers had different weights, were made from hollow fibers having different percentages of Polymer 1 and Polymer 2, and were tested for puncture resistance (according to STM-00483), grab tensile strength (according to STM-00146), trapezoidal tear strength (according to STM-00195).

Figure 9:
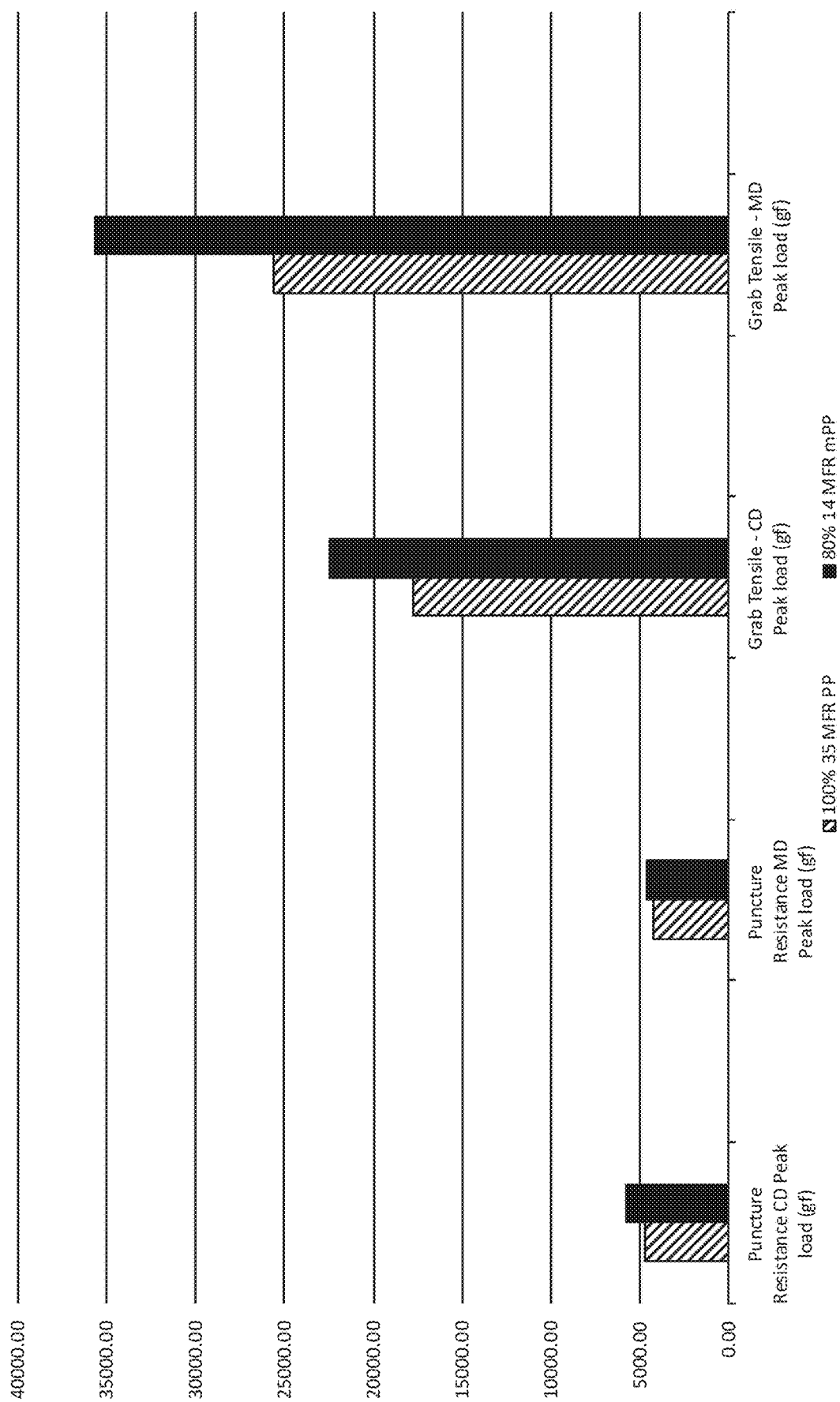
FIG. 9 is a graph comparing mechanical properties of fabrics formed from fibers having various blends and weights according to aspects of the current disclosure.
Figure 10:
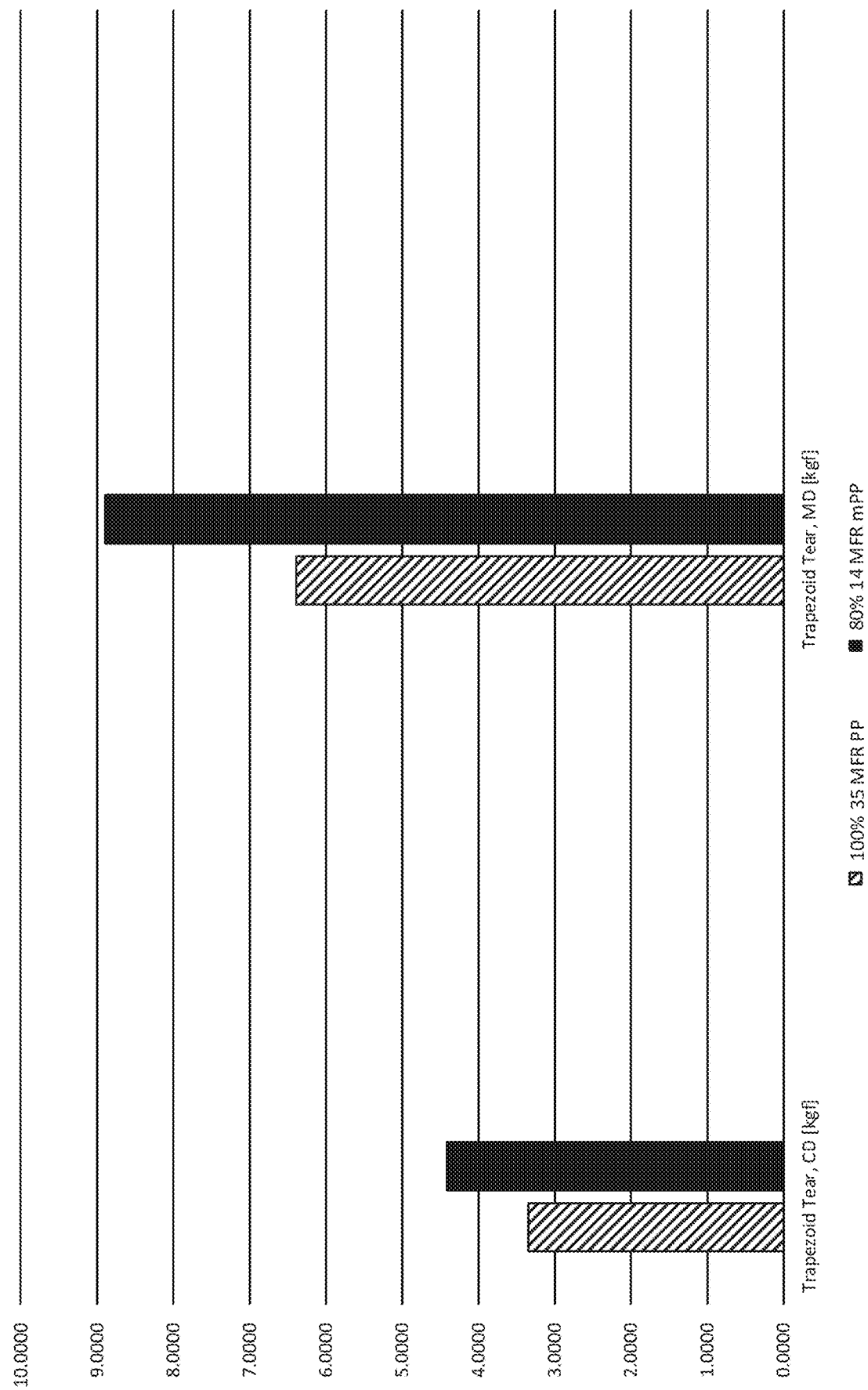
FIG. 10 is a graph comparing mechanical properties of fabrics formed from fibers having various blends and weights according to aspects of the current disclosure.

The compositions of sample fabrics represented by the diagonally stripped pattern bars and the solid pattern bars are shown in Table 3 below. FIGS. 9 and 10 summarize the results from the tests of these sample fabrics tests.

TABLE 3

Compositions of Sample Fabrics of FIGS. 9 and 10

| Bar pattern in FIGS. 9 and 10 | % Polymer 1 | % Polymer 2 | Weight (gsm) | Hollowness (%) |
|---|---|---|---|---|
| Diagonally stripped | 100 | 0 | 70 | 10 |
| Solid | 20 | 80 | 58 | 16-25 |

As illustrated, fabrics with blended fibers formed from low MFR PP polymers and high MFR PP polymers had improved mechanical properties compared to the fabrics with fibers that were just high MFR PP polymers even though the fabrics with blended polymers had a reduced weight and the fibers of such fabrics had increased hollowness.

Example 5

Sample fabrics were formed with different weights and from fibers having different average diameters and different percentages of Polymer 1 and Polymer 2 were tested for puncture resistance (according to STM-00483), grab tensile strength (according to STM-00146), and bursting strength (according to ISO 13932-2:1999, which is entitled TEXTILES—BURSTING PROPERTIES OF FABRICS—PART 2: PNEUMATIC METHOD FOR DETERMINATION OF BURSTING STRENGTH AND BURSTING DISTENSION and published in 1999 (incorporated herein by reference)).

Each fabric was produced as a SMS fabric having two spunbond layers and a meltblown layer laminated (calendered) between the spunbond layers. The weight of the meltblown layer was 17 gsm. In this example, the spunbond layer of each sample fabric was formed with a two segment spinneret. The meltblown layer included 100% meltblown grade polypropylene having a MFR of from about 155 MFR to about 800 MFR.

The composition of the samples in this example are shown below in Table 4.

TABLE 4

Compositions of Samples 15-19

| Sample | % Polymer 1 in fibers forming spunbond layer | % Polymer 2 in fibers forming spunbond layers | Hollow or solid fibers forming spunbond layers? | Average diameter of fibers forming spunbond layers (microns) | Total spunbond weight (gsm) | Total weight (spunbond weight + meltblown weight) (gsm) |
|---|---|---|---|---|---|---|
| 15 | 100 | 0 | Solid | 20 | 35.5 | 52.5 |
| 16 | 100 | 0 | Solid | 15 | 35.5 | 52.5 |
| 17 | 20 | 80 | Hollow | 18 | 35.5 | 52.5 |
| 18 | 100 | 0 | Hollow | 18 | 35.5 | 52.5 |
| 19 | 20 | 80 | Solid | 19 | 35.5 | 52.5 |

Figure 11:
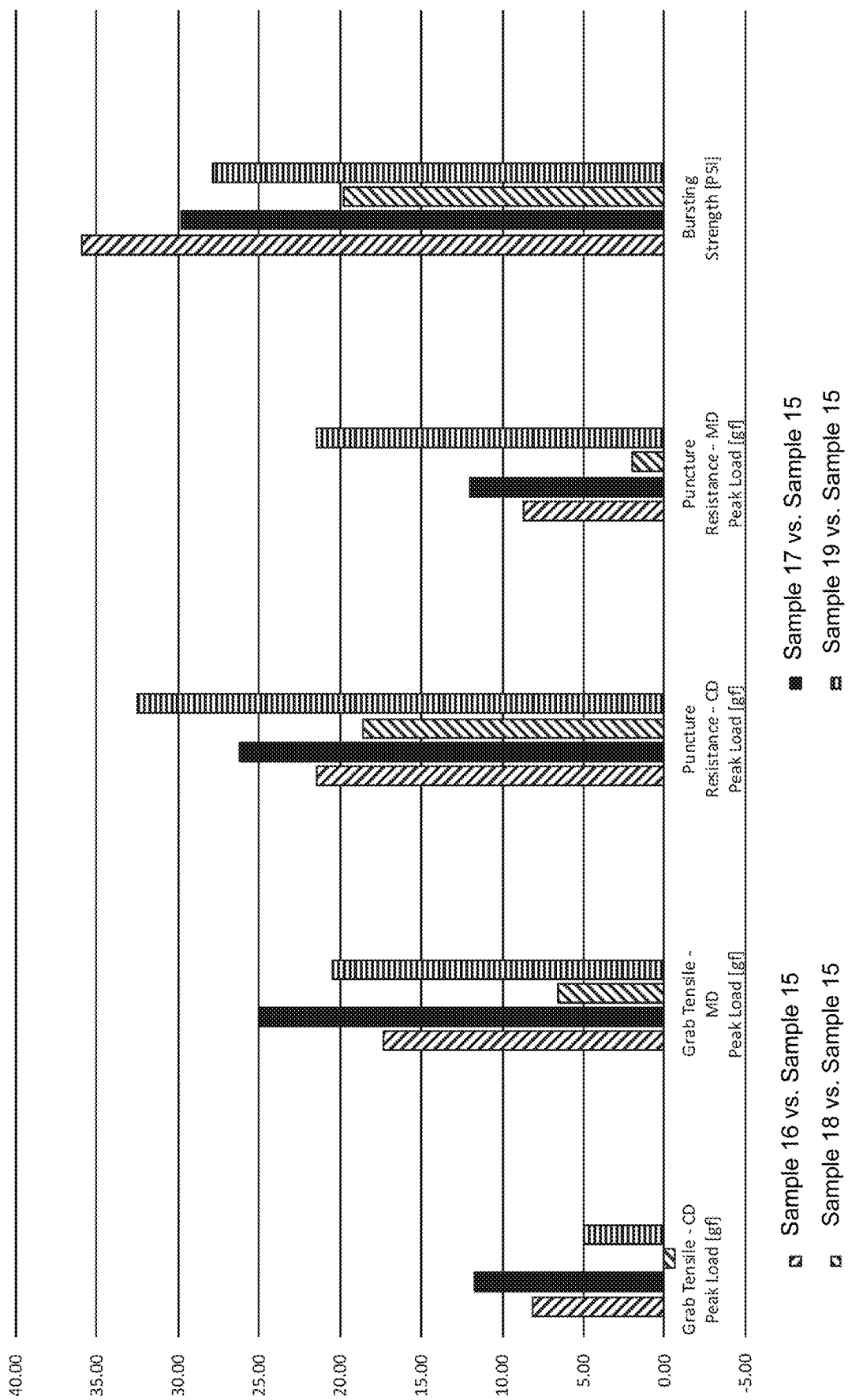
FIG. 11 is a graph comparing mechanical properties of fabrics formed from fibers having various blends and weights according to aspects of the current disclosure.

FIG. 11 summarizes the percent change when the testing results for the samples were compared to each other. The bars with the downward diagonal pattern represent the percent change of Sample 16 compared to Sample 15. The bars with the solid pattern represent the percent change of Sample 17 compared to Sample 15. The bars with the upward diagonal pattern represent the percent change of Sample 18 compared to Sample 15. The bars with the horizontal line pattern represent the percent change of Sample 19 compared to Sample 15.

Referring to the downward diagonal pattern bars of FIG. 11, the fabrics having solid fibers with 100% high MFR polymers and the reduced average diameter (15 microns) generally had increased mechanical properties compared to the fabrics with solid fibers with 100% high MFR polymers and the increased average diameter (20 microns). Without being bound by any theory, it is believed that in the fabrics with fibers having a reduced average diameter, the fibers have increased contact with other fibers, and the increased contact provides improved strength.

Referring to the solid pattern bars of FIG. 11, the fabrics with the hollow fibers with the blend and reduced average diameter (18 microns) generally had increased mechanical properties compared to the fabrics with the solid fibers with 100% high MFR polymers and the increased average diameter (20 microns). Without being bound by any theory, it is believed that the fabrics with the fibers formed from the polymer blend provide improved strength, and it is also believed that the fibers having the reduced average diameter have increased contact with other fibers in the fabric, which also provides improved strength. Without being bound by any theory, it is also believed that the hollowness of the fibers of the fabric allows for the sample fabric with the hollow blended fibers to provide the improved strength when provided in a fabric at the same weight as the solid fibers. Conversely, to achieve the same mechanical properties as a fabric with the solid fibers, a sample fabric with blended hollow fibers at a reduced weight could be used.

Referring to the upward diagonal pattern bars of FIG. 11, the fabric with the hollow fibers with 100% high MFR polymers and the reduced average diameter (18 microns) generally had increased mechanical properties compared to the fabric with the solid fibers with 100% high MFR polymers and the increased average diameter (20 microns). Without being bound by any theory, it is believed the fibers with reduced average diameter have increased contact with other fibers in the fabric, and the increased contact provides improved strength to the fabric. Without being bound by any theory, it is also believed that the hollowness of the fibers allows for the sample fabric with the hollow fibers to provide the improved strength when provided at the same weight as fabrics with the solid fibers. Conversely, to achieve the same mechanical properties as fabrics with the solid fibers, a sample fabric with hollow fibers at a reduced weight could be used.

Referring to the bars with the horizontal line pattern, the fabric with solid fibers with blend and the reduced average diameter (18 microns) generally had increased mechanical properties compared to the fabric with solid fibers with 100% high MFR polymers and the increased average diameter (20 microns). Without being bound by any theory, it is believed that the fabric with the fibers formed from the polymer blend provides improved strength, and it is also believed that the fibers with the reduced average diameter have increased contact with other fibers, which also provides improved strength to the fabric.

From FIG. 11, it can be seen that the blend of polymers provides the biggest improvement to mechanical properties of the product. The reduced average diameter and the hollowness of the fibers also improves the mechanical properties of the product. Based on FIG. 9, the polymer blend, fiber average diameter, and/or hollowness of the fibers can be controlled to provide fibers with desired improved mechanical properties.

Example 6

Sample spunbond fabrics were formed with fibers having different average diameters and different percentages of Polymer 1 and Polymer 2, and the fabrics were tested for puncture resistance (according to STM-00483) and grab tensile strength (according to STM-00146). Each fabric was produced as a SMS fabric having two spunbond layers and a meltblown layer laminated (calendered) between the spunbond layers. The weight of each fabric was the same, but the polymer blend, hollowness of the fibers, and average diameter of the fibers was varied in each sample. In this example, the fibers were formed with a two segment spinneret.

Figure 12:
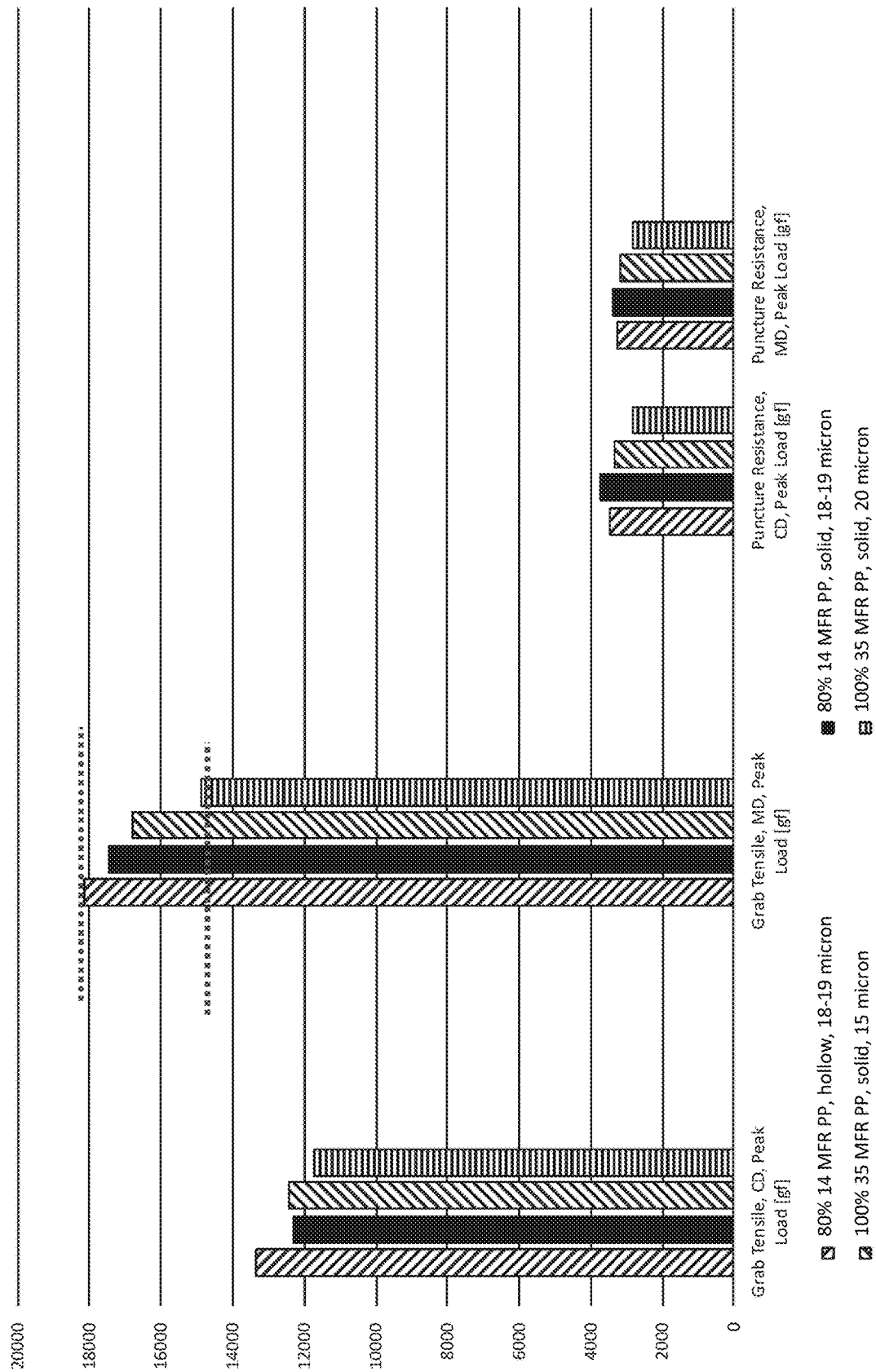
FIG. 12 is a graph comparing mechanical properties of fabrics formed from fibers having various blends and weights according to aspects of the current disclosure.

The compositions of sample fabrics represented by the diagonally stripped pattern bars and the solid pattern bars are shown in Table 5 below. FIG. 12 summarizes the results from the tests of these sample fabrics.

TABLE 5

Compositions of Sample Fabrics of FIG. 12

| Bar pattern in FIG. 12 | % Polymer 1 | % Polymer 2 | Average diameter (microns) | Hollow or solid fibers? |
|---|---|---|---|---|
| Downward diagonal | 20 | 80 | 18 | Hollow |

TABLE 5-continued

Compositions of Sample Fabrics of FIG. 12

| Bar pattern in FIG. 12 | % Polymer 1 | % Polymer 2 | Average diameter (microns) | Hollow or solid fibers? |
|---|---|---|---|---|
| Solid | 20 | 80 | 18 | Solid |
| Upward diagonal | 100 | 0 | 15 | Solid |
| Horizontal line | 100 | 0 | 20 | Solid |

From FIG. 12, it can be seen that the blended polymers, the reduced average diameter fibers, and hollow fibers in various combinations improved mechanical properties compared to the unblended, solid fibers with the increased average diameter (i.e., represented by the bars with the horizontal line pattern).

Example 7

Sample fabrics were formed with different weights and from fibers having different average diameters and different percentages of Polymer 1 and Polymer 2. Each fabric was produced as a SMS fabric having two spunbond layers and a meltblown layer laminated (calendered) between the spunbond layers. The weight of the meltblown layer was 17 gsm. In this example, the spunbond layer of each sample fabric was formed with a two segment spinneret. The fabrics were tested for puncture resistance (according to STM-00483), grab tensile strength (according to STM-00146), and trapezoidal tear strength (according to STM-00195).

Figure 13:
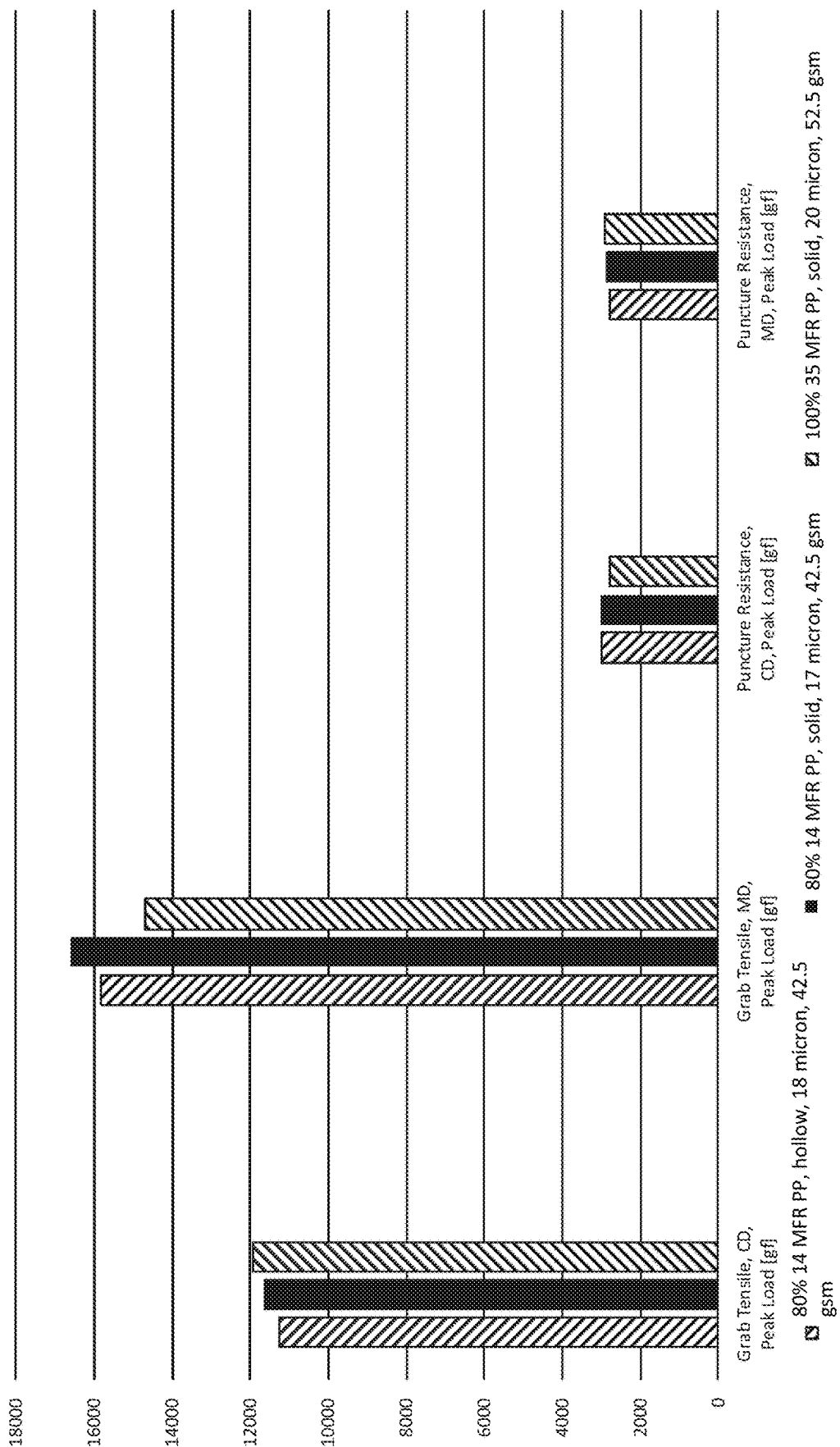
FIG. 13 is a graph comparing mechanical properties of fabrics formed from fibers having various blends and weights according to aspects of the current disclosure.
Figure 14:
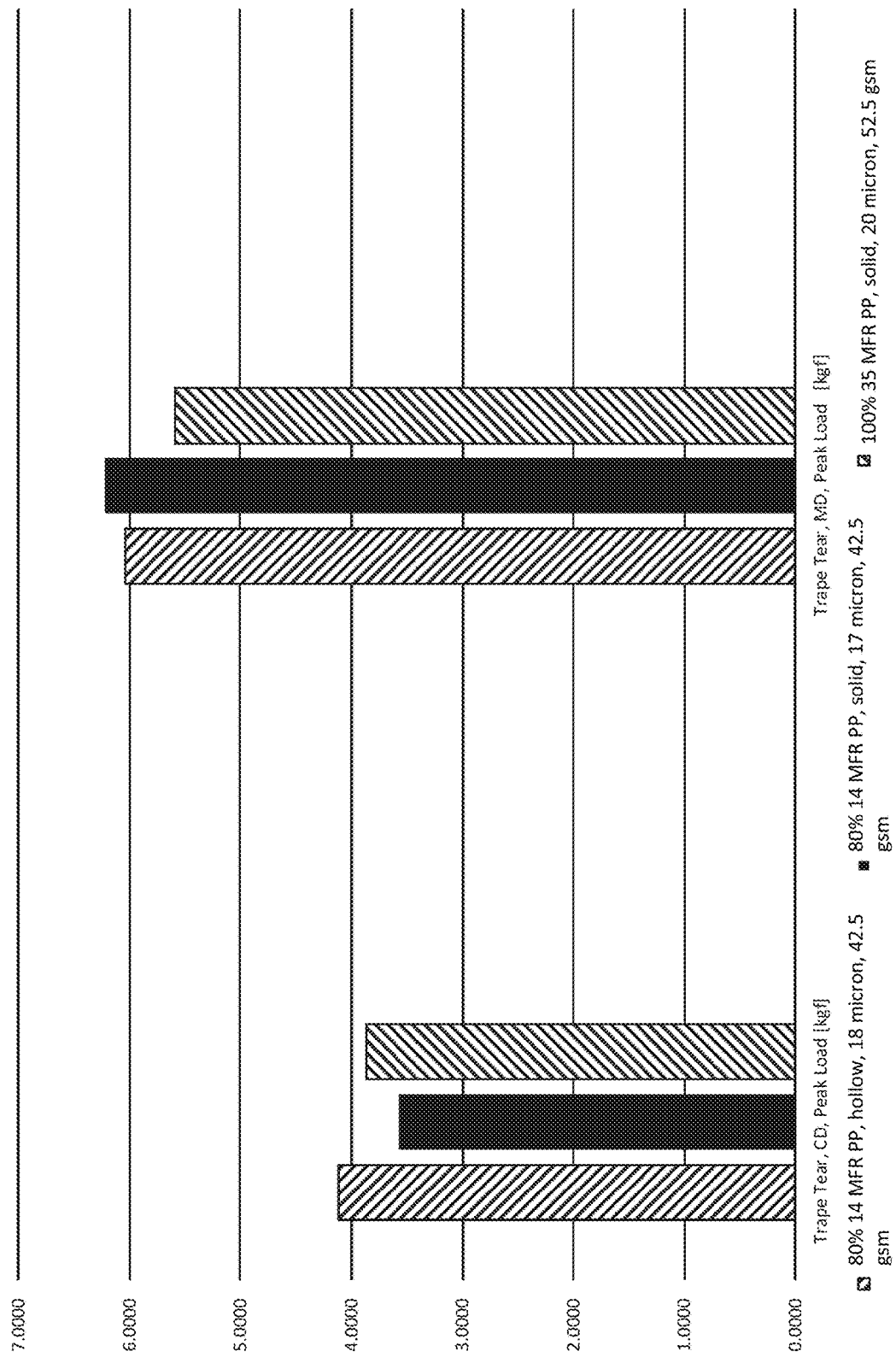
FIG. 14 is a graph comparing mechanical properties of fabrics formed from fibers having various blends and weights according to aspects of the current disclosure.

The composition of the samples in this example are shown below in Table 6. FIGS. 13 and 14 summarize the results from these tests for the different fabrics.

TABLE 6

Compositions of Sample Fabrics of FIGS. 13 and 14

| Bar pattern in FIGS. 13 and 14 | % Polymer 1 in fibers forming spunbond layer | % Polymer 2 in fibers forming spunbond layers | Hollow or solid fibers forming spunbond layers? | Average diameter of fibers forming spunbond layers (microns) | Total spunbond weight (gsm) | Total weight (spunbond weight + meltblown weight) (gsm) |
|---|---|---|---|---|---|---|
| Downward diagonal | 20 | 80 | Hollow | 18 | 25.5 | 42.5 |
| Solid | 20 | 80 | Solid | 17 | 25.5 | 42.5 |
| Upward diagonal | 100 | 0 | Solid | 20 | 35.5 | 52.5 |

From FIGS. 13 and 14, it can be seen that the blended of polymers, fiber average diameter, hollowness of the fibers, and weight of the fabric can be controlled to improve mechanical properties as desired.

Exemplary Embodiments

A collection of exemplary embodiments (EEs), including at least some explicitly enumerated, providing additional description of a variety of embodiment types in accordance with the concepts described herein are provided below. These examples are not meant to be mutually exclusive, exhaustive, or restrictive; and the invention is not limited to these example embodiments but rather encompasses all possible modifications and variations within the scope of the issued claims and their equivalents.

EE 1. A fiber comprising a fiber body, the fiber body comprising a blend of a first polymer and a second polymer, wherein a melt flow rate (MFR) of the first polymer is greater than a MFR of the second polymer, wherein the blend comprises at least 10% by weight of the second polymer, and wherein the hollow fiber is formed as a spunbond layer on a REICOFIL® III line or on a REICOFIL® IV line.

EE 2. The fiber of any preceding or subsequent exemplary embodiments or combination of exemplary embodiments, wherein the spunbond layer comprising the fiber has an improved mechanical property in at least one of a machine direction or a cross-machine direction compared to a fiber comprising only the first polymer.

EE 3. The fiber of any preceding or subsequent exemplary embodiments or combination of exemplary embodiments, wherein the improved mechanical property comprises at least one of a trap tear strength, a strip tensile strength, a puncture resistance, and a grab tensile strength, and wherein the at least one direction is the machine direction.

EE 4. A spunbond comprising the fiber of any preceding or subsequent exemplary embodiments or combination of exemplary embodiments, wherein a weight of the spunbond layer is less than about 105 gsm.

EE 5. A spunbond non-woven fabric comprising the fiber of any preceding or subsequent exemplary embodiments or combination of exemplary embodiments.

EE 6. The fiber of any preceding or subsequent exemplary embodiments or combination of exemplary embodiments, wherein the fiber body is a hollow and defines a hollow cavity within the fiber body, and wherein the hollow cavity comprises up to about 25% of the fiber body.

EE 7. The fiber of any preceding or subsequent exemplary embodiments or combination of exemplary embodiments, wherein the spunbond layer comprising the fiber is formed with at least one of a two segment spinneret, a three segment spinneret, or a four segment spinneret.

EE 8. A fiber comprising a fiber body extending in a longitudinal direction, the fiber body comprising a blend of a first polymer and a second polymer, wherein a melt flow rate (MFR) of the first polymer is greater than a MFR of the second polymer, wherein the blend comprises at least 10% by weight of the second polymer, and wherein the fiber is formed as a spunbond layer on a REICOFIL® III line or on a REICOFIL® IV line.

EE 9. The fiber of any preceding or subsequent exemplary embodiments or combination of exemplary embodiments, wherein the spunbond layer comprising the fiber has an improved mechanical property in at least one of a machine direction or a cross-machine direction compared to a spunbond fabric comprising a fiber comprising only the first polymer.

EE 10. The fiber of any preceding or subsequent exemplary embodiments or combination of exemplary embodiments, wherein the improved mechanical property comprises at least one of a trap tear strength, a strip tensile strength, a puncture resistance, and a grab tensile strength, and wherein the at least one direction is the machine direction.

EE 11. A spunbond comprising the fiber of any preceding or subsequent exemplary embodiments or combination of exemplary embodiments, wherein a weight of the spunbond layer is less than about 105 gsm.

EE 12. A spunbond non-woven fabric comprising the fiber of any preceding or subsequent exemplary embodiments or combination of exemplary embodiments.

EE 13. The fiber of any preceding or subsequent exemplary embodiments or combination of exemplary embodiments, wherein the fiber body is a hollow and defines a hollow cavity within the fiber body.

EE 14. The fiber of any preceding or subsequent exemplary embodiments or combination of exemplary embodiments, wherein the spunbond layer comprising the fiber is formed with at least one of a two segment spinneret, a three segment spinneret, or a four segment spinneret.

EE 15. A fiber comprising a fiber body, the fiber body comprising a blend of a first polymer and a second polymer, wherein a melt flow rate (MFR) of the first polymer is greater than a MFR of the second polymer, wherein the blend comprises at least 10% by weight of the second polymer, and wherein a spunbond layer of a non-woven fabric comprises the fiber, and wherein the spunbond layer has a weight of less than about 105 gsm.

EE 16. A spunbond comprising the fiber of any preceding or subsequent exemplary embodiments or combination of exemplary embodiments, wherein a weight of a spunbond comprising the fiber is less than about 105 gsm.

EE 17. The fiber of any preceding or subsequent exemplary embodiments or combination of exemplary embodiments, wherein the fiber body is a hollow and defines a hollow cavity within the fiber body.

EE 18. A spunbond non-woven fabric comprising a plurality of fibers, wherein each fiber comprises: a blend of a first polymer and a second polymer, wherein a melt flow rate (MFR) of the first polymer is greater than a MFR of the second polymer, wherein the blend comprises 20%-30% by weight of the first polymer; and a fiber average diameter of from about 15 microns to about 20 microns, and wherein a calendar bond area of the fabric comprises a bond area of from about 15% to about 35%.

EE 19. A hollow fiber comprising a fiber body extending in a longitudinal direction and defining a hollow cavity within the fiber body, wherein the fiber body comprises a blend of a first polymer and a second polymer, wherein a melt flow rate (MFR) of the first polymer is greater than a MFR of the second polymer, and wherein the blend comprises at least 10% by weight of the second polymer.

EE 20. The hollow fiber of any preceding or subsequent exemplary embodiments or combination of exemplary embodiments, wherein the blend comprises 10% to 70% by weight of the second polymer.

EE 21. The hollow fiber of any preceding or subsequent exemplary embodiments or combination of exemplary embodiments, wherein the MFR of the first polymer is greater than 18 g/10 min.

EE 22. The hollow fiber of any preceding or subsequent exemplary embodiments or combination of exemplary embodiments, wherein the MFR of the second polymer is from about 9 g/10 min to about 18 g/10 min.

EE 23. The hollow fiber of any preceding or subsequent exemplary embodiments or combination of exemplary embodiments, wherein the first polymer and the second polymer each comprise a polyolefin.

EE 24. The hollow fiber of any preceding or subsequent exemplary embodiments or combination of exemplary embodiments, wherein the hollow cavity comprises from about 5% to about 40% of the fiber body.

EE 25. The hollow fiber of any preceding or subsequent exemplary embodiments or combination of exemplary embodiments, wherein the hollow cavity comprises from about 10% to about 30% by volume of the fiber body.

EE 26. A spunbond non-woven fabric comprising the hollow fiber of any preceding or subsequent exemplary embodiments or combination of exemplary embodiments.

EE 27. The hollow fiber of any preceding or subsequent exemplary embodiments or combination of exemplary embodiments, further comprising a sheath layer, the sheath layer comprising a third polymer, wherein a MFR of the third polymer is greater than the MFR of the second polymer.

EE 28. The hollow fiber of any preceding or subsequent exemplary embodiments or combination of exemplary embodiments, wherein the MFR of the third polymer is the same as the MFR of the first polymer.

EE 29. The hollow fiber of any preceding or subsequent exemplary embodiments or combination of exemplary embodiments, wherein the third polymer comprises a polyolefin.

EE 30. The hollow fiber of any preceding or subsequent exemplary embodiments or combination of exemplary embodiments, wherein the sheath layer further comprises an additive, and wherein the additive comprises at least one of a fluorochemical, an antimicrobial, a surfactant, and a color pigment.

EE 31. A non-woven fabric comprising the hollow fiber of any preceding or subsequent exemplary embodiments or combination of exemplary embodiments.

EE 32. A hygiene product comprising the spunbond non-woven fabric of any preceding or subsequent exemplary embodiments or combination of exemplary embodiments, wherein the hygiene product comprises at least one of a surgical gown, a drape, gloves, facemasks, and protective apparel, surgical gowns, sterilization wraps, respirators, absorbent pads, wound care products, chemical protection apparel, filtration media, hospital towels, hospital apparel, drapes, gloves, facemasks, sanitary napkins, and diapers.

EE 33. The hollow fiber of any preceding or subsequent exemplary embodiments or combination of exemplary embodiments, wherein the blend further comprises a third polymer.

EE 34. The hollow fiber of any preceding or subsequent exemplary embodiments or combination of exemplary embodiments, wherein the MFR of the third polymer is less than the MFR of the first polymer.

EE 35. The hollow fiber of any preceding or subsequent exemplary embodiments or combination of exemplary embodiments, wherein the MFR of the third polymer is less than the MFR of the second polymer.

EE 36. A method of manufacturing a spunbond layer of a non-woven fabric, the method comprising producing a plurality of fibers by: mixing a first polymer with a second polymer into a blend, wherein a melt flow rate (MFR) of the first polymer is greater than a MFR of the second polymer, and wherein the blend comprises at least 10% by weight of the second polymer; drawing the blend through a spinneret to form the plurality of fibers; quenching the fibers; and depositing the fibers as a web.

EE 37. The method of any preceding or subsequent exemplary embodiments or combination of exemplary embodiments, wherein the blend comprises 10% to 70% by weight of the second polymer.

EE 38. The method of any preceding or subsequent exemplary embodiments or combination of exemplary embodiments, wherein the MFR of the first polymer is greater than 18 g/10 min, and wherein the MFR of the second polymer is from about 9 g/10 min to about 18 g/10 min.

EE 39. The method of any preceding or subsequent exemplary embodiments or combination of exemplary embodiments, wherein the first polymer and the second polymer each comprise a polyolefin.

EE 40. The method of any preceding or subsequent exemplary embodiments or combination of exemplary embodiments, further comprising forming a non-woven fabric with the spunbond layer.

EE 41. The method of any preceding or subsequent exemplary embodiments or combination of exemplary embodiments, wherein forming the non-woven fabric comprises forming a surgical product, wherein the surgical product comprises at least one of a surgical gown, a drape, gloves, facemasks, and protective apparel.

EE 42. A spunbond non-woven fabric comprising a plurality of fibers, wherein the fibers are formed from a polymer blend comprising at least one first polymer and at least one second polymer, wherein a melt flow rate (MFR) of the at least one first polymer is greater than a MFR of the at least one second polymer, wherein the MFR of the at least one second polymer is less than 18 g/10 min, and wherein the blend comprises a percentage by weight of the second polymer that is greater than a percentage by weight of the first polymer.

EE 43. The spunbond non-woven fabric of any preceding or subsequent exemplary embodiments or combination of exemplary embodiments, wherein a weight of the fabric is less than about 105 gsm, and wherein the fabric has a mechanical property in a machine direction that is greater than the mechanical property in the machine direction of a spunbond fabric comprising fibers formed from only the first polymer and under the same conditions, and wherein the mechanical property comprises at least one of a trap tear strength, a strip tensile strength, a puncture resistance, or a grab tensile strength.

EE 44. The spunbond non-woven fabric of any preceding or subsequent exemplary embodiments or combination of exemplary embodiments, wherein the weight of the fabric is from about 8 gsm to about 15 gsm.

EE 45. The spunbond non-woven fabric of any preceding or subsequent exemplary embodiments or combination of exemplary embodiments, wherein the MFR of the at least one first polymer is from greater than 18 g/10 min to about 40 g/10 min.

EE 46. The spunbond non-woven fabric of any preceding or subsequent exemplary embodiments or combination of exemplary embodiments, wherein the fibers each comprise a fiber body that surrounds and defines a cavity, wherein the fiber body and the cavity together define a total volume, and wherein the fibers comprise a hollowness of up to about 25% by volume of the total volume.

EE 47. The spunbond non-woven fabric of any preceding or subsequent exemplary embodiments or combination of exemplary embodiments, wherein the polymer blend comprises 50% to 90% by weight of the at least one second polymer.

EE 48. The spunbond non-woven fabric of any preceding or subsequent exemplary embodiments or combination of exemplary embodiments, wherein an average diameter of each fiber is from about 13 microns to about 22 microns.

EE 49. A non-woven fabric comprising the spunbond non-woven fabric of any preceding or subsequent exemplary embodiments or combination of exemplary embodiments as a first spunbond layer, wherein the non-woven fabric further comprises a second spunbond layer and a meltblown layer laminated between the first spunbond layer and the second spunbond layer, and wherein the second spunbond layer comprises a plurality of fibers, each formed from a polymer blend comprising the at least one first polymer and the at least one second polymer.

EE 50. A spunbond non-woven fabric comprising a plurality of fibers, wherein the fibers are formed from a polymer blend comprising at least one first polymer and at least one second polymer, wherein a melt flow rate (MFR) of the at least one first polymer is from about 19 g/10 min to about 40 g/10 min, wherein a MFR of the at least one second polymer is about 9 g/10 min to about 18 g/10 min, wherein the blend comprises at least 10% by weight of the at least one second polymer, and wherein an average diameter of each fiber is from about 13 microns to about 22 microns.

EE 51. The spunbond non-woven fabric of any preceding or subsequent exemplary embodiments or combination of exemplary embodiments, wherein a weight of the fabric is less than about 105 gsm, and wherein the fabric has a mechanical property in a machine direction that is greater the mechanical property in the machine direction of a spunbond fabric comprising fibers formed from only the first polymer and under the same conditions, and wherein the mechanical property comprises at least one of a trap tear strength, a strip tensile strength, a puncture resistance, or a grab tensile strength.

EE 52. The spunbond non-woven fabric of any preceding or subsequent exemplary embodiments or combination of exemplary embodiments, wherein weight of the spunbond non-woven fabric is from about 42 gsm to about 52 gsm.

EE 53. The spunbond non-woven fabric of any preceding or subsequent exemplary embodiments or combination of exemplary embodiments, wherein the polymer blend comprises 20% to 90% by weight of the at least one second polymer.

EE 54. The spunbond non-woven fabric of any preceding or subsequent exemplary embodiments or combination of exemplary embodiments, wherein the fibers each comprise a fiber body that surrounds and defines a cavity, wherein the fiber body and the cavity together define a total volume, and wherein the fibers comprise a hollowness up to about 25% by volume of the total volume.

EE 55. A non-woven fabric comprising the spunbond non-woven fabric of claim 9 as a first spunbond layer, wherein the non-woven fabric further comprises a second spunbond layer and a meltblown layer laminated between the first spunbond layer and the second spunbond layer, and wherein the second spunbond layer comprises a plurality of fibers formed from a polymer blend comprising the at least one first polymer and the at least one second polymer.

EE 56. A spunbond non-woven fabric comprising a plurality of hollow fibers, wherein the hollow fibers are formed from a polymer blend comprising at least one first polymer and at least one second polymer, wherein a melt flow rate (MFR) of the at least one first polymer is greater than a MFR of the at least one second polymer, wherein the MFR of the at least one second polymer is about 9 g/10 min to less than 18 g/10 min, wherein the blend comprises at least 10% by weight of the second polymer, wherein the hollow fibers each comprise a fiber body that defines a cavity within the fiber body, wherein the cavity and the fiber body together define a total volume, and wherein the fibers comprise a hollowness of at least 5% by volume of the total volume.

EE 57. The spunbond non-woven fabric of claim 14, wherein the fibers comprise a hollowness up to about 40% by volume of the total volume EE 58. The spunbond non-woven fabric of any preceding or subsequent exemplary embodiments or combination of exemplary embodiments, wherein the polymer blend comprises 20% to 90% by weight of the at least one second polymer.

EE 59. The spunbond non-woven fabric of any preceding or subsequent exemplary embodiments or combination of exemplary embodiments, wherein the MFR of the at least one first polymer is from about 19 g/10 min to about 40 g/10 min.

EE 60. The spunbond non-woven fabric of any preceding or subsequent exemplary embodiments or combination of exemplary embodiments, wherein an average diameter of each fiber is from about 13 microns to about 22 microns.

EE 61. The spunbond non-woven fabric of any preceding or subsequent exemplary embodiments or combination of exemplary embodiments, wherein the at least one first polymer and the at least one second polymer each comprise a polyolefin.

EE 62. The spunbond non-woven fabric of any preceding or subsequent exemplary embodiments or combination of exemplary embodiments, wherein a weight of the spunbond non-woven fabric is less than about 105 gsm, and wherein the spunbond non-woven fabric has an improved mechanical property in a machine direction compared to a spunbond fabric comprising a spunbond non-woven fiber comprising fibers comprising only the first polymer, and wherein the improved mechanical property comprises at least one of a trap tear strength, a strip tensile strength, a puncture resistance, and a grab tensile strength.

The above-described aspects are merely possible examples of implementations, merely set forth for a clear understanding of the principles of the present disclosure. Many variations and modifications can be made to the above-described embodiment(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. Moreover, although specific terms are employed herein, as well as in the claims that follow, they are used only in a generic and descriptive sense, and not for the purposes of limiting the described invention, nor the claims that follow.

That which is claimed:

1. A spunbond non-woven fabric comprising a plurality of fibers, wherein the fibers are formed from a polymer blend comprising at least one first polymer and at least one second polymer,
wherein a melt flow rate (MFR) of the at least one first polymer is greater than a MFR of the at least one second polymer,
wherein the MFR of the at least one second polymer is from 9 g/10 min to less than 18 g/10 min,
wherein the MFR of the at least one first polymer is from 18 g/10 min to 40 g/10 min,
wherein the polymer blend comprises a percentage by weight of the second polymer that is greater than a percentage by weight of the first polymer, wherein the polymer blend comprises up to 30% by weight of the first polymer and at least 70% by weight of the second polymer, and
wherein an average diameter of each fiber is less than or equal to 30 microns.

2. The spunbond non-woven fabric of claim 1, wherein a weight of the fabric is from about 42.5 gsm to less than about 105 gsm, and wherein the fabric has a mechanical property that is greater than the mechanical property of a spunbond fabric comprising fibers formed from only the first polymer and under the same conditions, and wherein the mechanical property comprises at least one of a trap tear strength, a strip tensile strength, a puncture resistance, or a grab tensile strength.

3. The spunbond non-woven fabric of claim 2, wherein the mechanical property is at least 20% greater than the mechanical property of the spunbond fabric comprising fibers formed from only the first polymer under the same conditions.

4. The spunbond non-woven fabric of claim 1, wherein a weight of the fabric is less than about 105 gsm, and wherein the fabric has a mechanical property in a machine direction that is greater than the mechanical property in the machine direction of a spunbond fabric comprising fibers formed from only the first polymer and under the same conditions, and wherein the mechanical property comprises at least one of a trap tear strength, a strip tensile strength, a puncture resistance, or a grab tensile strength.

5. The spunbond non-woven fabric of claim 4, wherein the weight of the fabric is from about 8 gsm to about 15 gsm.

6. The spunbond non-woven fabric of claim 1, wherein the fibers each comprise a fiber body that surrounds and defines a cavity, wherein the fiber body and the cavity together define a total volume, and wherein the fibers comprise a hollowness of up to about 25% by volume of the total volume.

7. The spunbond non-woven fabric of claim 1, wherein an average diameter of each fiber is from about 13 microns to about 22 microns.

8. A non-woven fabric comprising the spunbond non-woven fabric of claim 1 as a first spunbond layer, wherein the non-woven fabric further comprises a second spunbond layer and a meltblown layer laminated between the first spunbond layer and the second spunbond layer, and wherein the second spunbond layer comprises a plurality of fibers, each formed from a polymer blend comprising the at least one first polymer and the at least one second polymer.

9. A spunbond non-woven fabric comprising a plurality of fibers, wherein the fibers are formed from a polymer blend comprising at least one first polymer and at least one second polymer,
wherein a melt flow rate (MFR) of the at least one first polymer is from about 19 g/10 min to about 40 g/10 min,
wherein a MFR of the at least one second polymer is about 9 g/10 min to about 18 g/10 min,
wherein the polymer blend comprises 10% to 30% by weight of the at least one first polymer and 70% to 90% by weight of the at least one second polymer, and wherein an average diameter of each fiber is from about 13 microns to about 22 microns.

10. The spunbond non-woven fabric of claim 9, wherein the fibers each comprise a fiber body that surrounds and defines a cavity, wherein the fiber body and the cavity together define a total volume, and wherein the fibers comprise a hollowness of at least 5% by volume of the total volume.

11. The spunbond non-woven fabric of claim 10, wherein the fibers comprise a hollowness up to about 40% by volume of the total volume.

12. The spunbond non-woven fabric of claim 11, wherein the fibers comprise a hollowness up to about 25% by volume of the total volume.

13. The spunbond non-woven fabric of claim 9, wherein the polymer blend comprises 20% to 30% by weight of the at least one first polymer and 70% to 80% by weight of the at least one second polymer.

14. A non-woven fabric comprising the spunbond non-woven fabric of claim 9 as a first spunbond layer, wherein the non-woven fabric further comprises a second spunbond layer and a meltblown layer laminated between the first spunbond layer and the second spunbond layer, and wherein the second spunbond layer comprises a plurality of fibers formed from a polymer blend comprising the at least one first polymer and the at least one second polymer.

15. The spunbond non-woven fabric of claim 9, wherein the at least one first polymer and the at least one second polymer each comprise a polyolefin.

16. The spunbond non-woven fabric of claim 9, wherein a total weight of the fabric is from about 42.5 gsm to less than about 105 gsm, and wherein the fabric has a mechanical property that is at least 5% greater than the mechanical property of a spunbond fabric comprising fibers formed from only the first polymer and under the same conditions, and wherein the mechanical property comprises at least one of a trap tear strength, a strip tensile strength, a puncture resistance, or a grab tensile strength.

17. The spunbond non-woven fabric of claim 16, wherein the mechanical property is at least 20% greater than the mechanical property of the spunbond fabric comprising fibers formed from only the first polymer and under the same conditions.

18. The spunbond non-woven fabric of claim 16, wherein the fibers each comprise a fiber body that surrounds and defines a cavity, wherein the fiber body and the cavity together define a total volume, and wherein the fibers comprise a hollowness of at least 5% by volume of the total volume.

19. A spunbond non-woven fabric comprising a plurality of fibers, wherein the fibers are formed from a polymer blend comprising at least one first polymer and at least one second polymer,
wherein a melt flow rate (MFR) of the at least one first polymer is greater than a MFR of the at least one second polymer,
wherein the MFR of the at least one second polymer is from 9 g/10 min to less than 18 g/10 min,
wherein the MFR of the at least one first polymer is from 18 g/10 min to 40 g/10 min, wherein the polymer blend comprises a percentage by weight of the second polymer that is greater than a percentage by weight of the first polymer,
wherein the polymer blend comprises 20-30% by weight of the first polymer,
wherein the fibers each comprise a fiber body that surrounds and defines a cavity,
wherein the fiber body and the cavity together define a total volume, and
wherein the fibers comprise a hollowness of greater than 0% up to about 25% by volume of the total volume.

20. The spunbond non-woven fabric of claim 19, wherein an average diameter of each fiber is less than or equal to 30 microns.

* * * * *